US012084782B2

(12) United States Patent
Hoffmann et al.

(10) Patent No.: US 12,084,782 B2
(45) Date of Patent: Sep. 10, 2024

(54) ELECTROLYSIS ELECTRODE AND METHODS OF MANUFACTURE AND USING SAME IN WATER PURIFICATION SYSTEM

(71) Applicant: California Institute of Technology, Pasadena, CA (US)

(72) Inventors: Michael R. Hoffmann, South Pasadena, CA (US); Yang Yang, Alhambra, CA (US)

(73) Assignee: California Institute of Technology, Pasadena, CA (US)

( * ) Notice: Subject to any disclaimer, the term of this patent is extended or adjusted under 35 U.S.C. 154(b) by 308 days.

(21) Appl. No.: 15/683,587

(22) Filed: Aug. 22, 2017

(65) Prior Publication Data

US 2018/0057952 A1    Mar. 1, 2018

Related U.S. Application Data

(60) Provisional application No. 62/380,150, filed on Aug. 26, 2016.

(51) Int. Cl.
*C25B 11/093* (2021.01)
*C01G 23/04* (2006.01)
(Continued)

(52) U.S. Cl.
CPC ........ *C25B 11/093* (2021.01); *C02F 1/46109* (2013.01); *C25B 1/26* (2013.01);
(Continued)

(58) Field of Classification Search
CPC ...... C25B 1/02–1/12; C25B 1/34–1/46; C25B 11/00; C25B 11/04; C25B 11/0405;
(Continued)

(56) References Cited

U.S. PATENT DOCUMENTS 2,967,807 A    1/1961 Osborne et al.
5,364,509 A    11/1994 Dietrich
(Continued)

FOREIGN PATENT DOCUMENTS

WO    2016/007198 A1    1/2016

OTHER PUBLICATIONS

Wang et al ("SnO2 Nanostructures-TiO2 Nanofibers Heterostructures: Controlled Fabrication and High Photocatalytic Properties", Inorganic Chemistry, 2009, 48, pp. 7261-7268). (Year: 2009).*
(Continued)

*Primary Examiner* — Alexander W Keeling
(74) *Attorney, Agent, or Firm* — Gavrilovich, Dodd & Lindsey LLP

(57) ABSTRACT

A heterojunction anode for electrolysis is disclosed. The anode has a first conductive metal oxide (FCMO) layer, a second semiconductor layer contacting the FCMO layer, and one or more islands of a third semiconductor contacting the second semiconductor layer. The FCMO layer may be formed on a metallic base, such as titanium. The FCMO layer may include iridium, the second semiconductor layer may include titanium oxide, and the third semiconductor may include tin oxide. The anode may be manufactured using spray pyrolysis to apply each semiconductor material. The anode may be configured such that when placed in an electrolyte at least a portion of the second semiconductor layer and the islands are in direct physical contact with the electrolyte. The second semiconductor interlayer and third semiconductor islands enhance the production of reactive chlorine in chlorinated water. A water treatment system and method using the anode are also disclosed.

8 Claims, 9 Drawing Sheets

(51) Int. Cl.
    *C01G 35/00*     (2006.01)
    *C01G 55/00*     (2006.01)
    *C02F 1/461*     (2023.01)
    *C02F 1/467*     (2023.01)
    *C25B 1/26*     (2006.01)

(52) U.S. Cl.
    CPC .............. *C01G 23/04* (2013.01); *C01G 35/00* (2013.01); *C01G 55/004* (2013.01); *C02F 2001/46138* (2013.01); *C02F 1/4674* (2013.01); *Y02W 10/37* (2015.05)

(58) Field of Classification Search
    CPC ........ C25B 11/0442; C25B 11/0478–11/0494; C02F 1/46109; C02F 2001/46133; C02F 2001/46138; C02F 2001/46142
    See application file for complete search history.

(56) References Cited

U.S. PATENT DOCUMENTS

| | | | |
|---|---|---|---|
| 2001/0042682 A1* | 11/2001 | Weres | C02F 1/46109 204/278.5 |
| 2005/0211553 A1* | 9/2005 | Mojana | C25B 11/0484 204/290.01 |
| 2010/0044219 A1 | 2/2010 | Carlson et al. | |
| 2012/0064435 A1 | 3/2012 | Maruyama et al. | |
| 2013/0112548 A1* | 5/2013 | Hermann | C02F 1/46109 204/242 |
| 2015/0354072 A1* | 12/2015 | Suchsland | H01M 4/8605 429/480 |
| 2016/0009574 A1 | 1/2016 | Hoffmann et al. | |

OTHER PUBLICATIONS

Felix et al ("Synthesis, Characterization, and Evaluation of IrO2 Based Binary Metal Oxide Electrocatalysts for Oxygen Evolution Reaciton", Internal Journal of Electrochemical Science, 7, 2012, pp. 12064-12077). (Year: 2012).*

Lin et al ("The properties of antimony-doped tin oxide thin films from the sol-gel process", Surface and Coatings Technology, vol. 88, issues 1-3, 1997, pp. 239-247). (Year: 1997).*

Adams et al ("Design and electrochemical study of SnO2-based mixed oxide electrodes", Electrochimica Acta, 54, 2009, pp. 1491-1498). (Year: 2009).*

Baharlou, Simin, International Preliminary Report on Patentability and Written Opinion, PCT/US2017/048066, The International Bureau of WIPO, Mar. 7, 2019.

Bagheri et al., "Cobalt Doped Titanium Dioxide Nanoparticles: Characterization and Electrocatalytic Study", Journal of the Chinese Chemical Society, vol. 61, Issue 6, Jun. 2014, pp. 702-706.

Young, Lee W., International Search Report and Written Opinion, PCT/US2017/048066, U.S. Patent and Trademark Office, Dec. 29, 2017.

Teppo, Kirsi-Marja, European Office Action, European Patent Office, EP17844302, Mar. 11, 2020.

Yang et al., "Multilayer Heterojunction Anodes for Saline Wastewater treatment: Design Strategies and Reactive Species Generation Mechanisms," Environ. Sci. Technol. 50:8780-8787, Jul. 12, 2016.

* cited by examiner

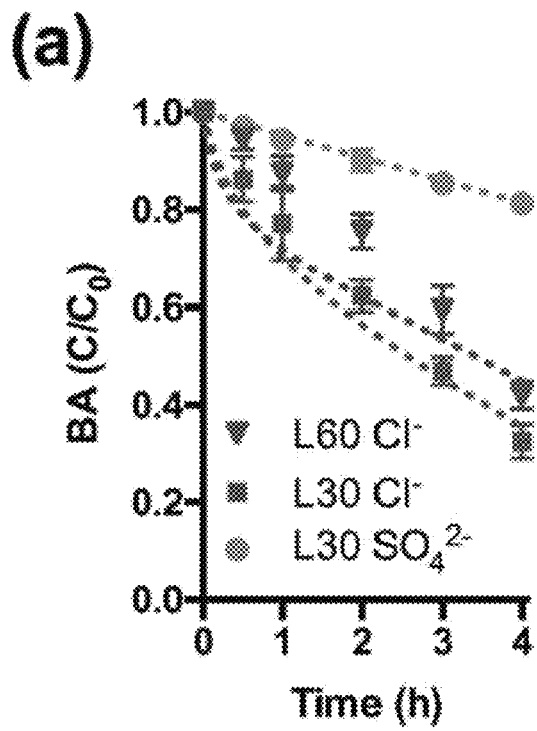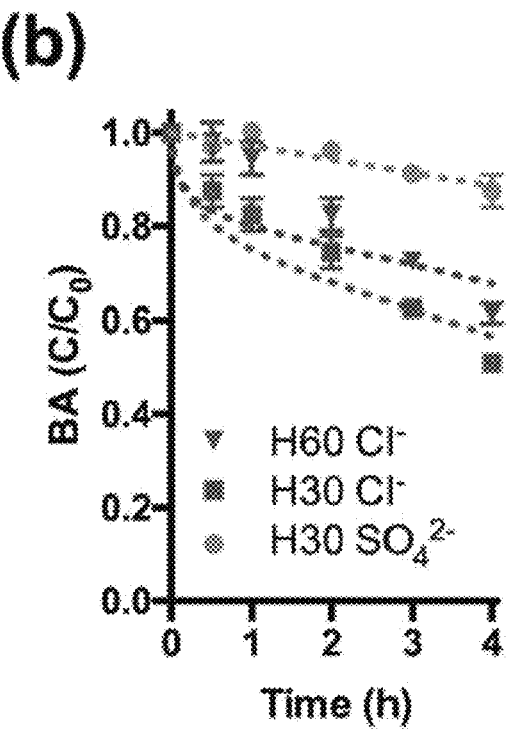
Figure 8A  Figure 8B
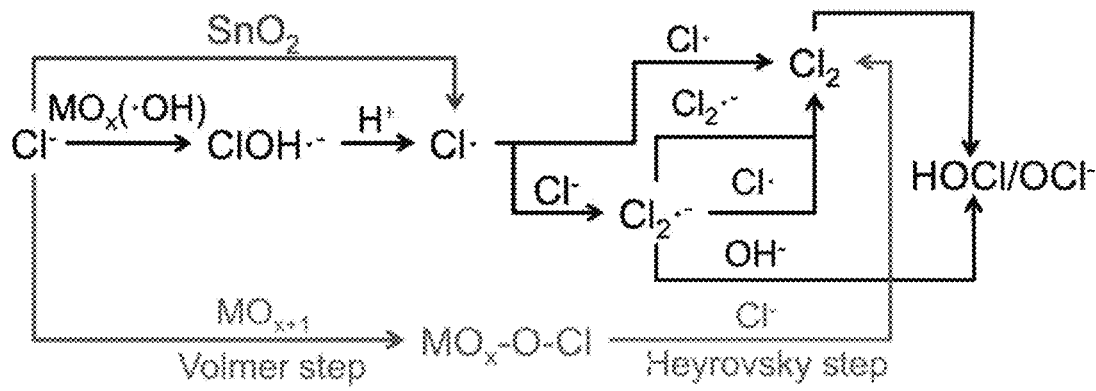
Figure 9

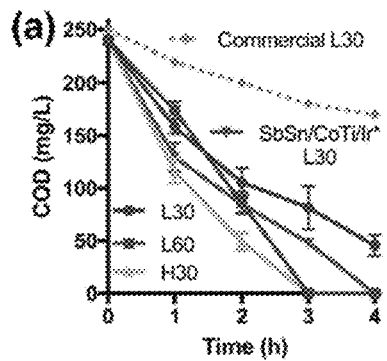 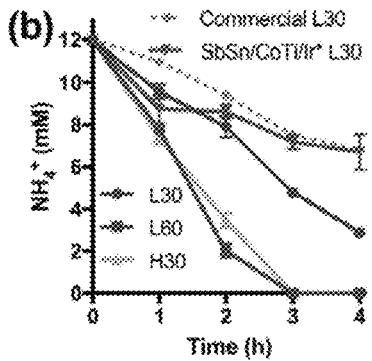 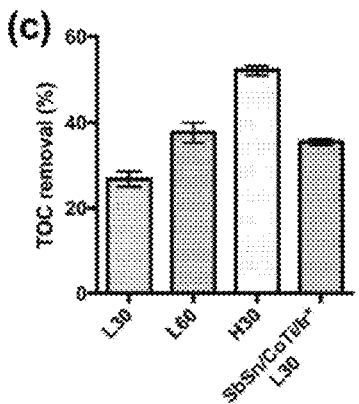
Figure 10A         Figure 10B         Figure 10C
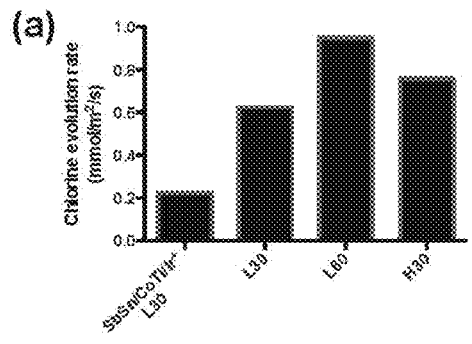
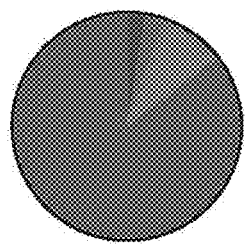 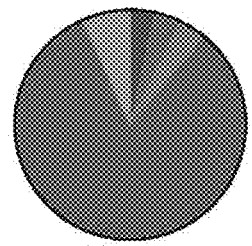
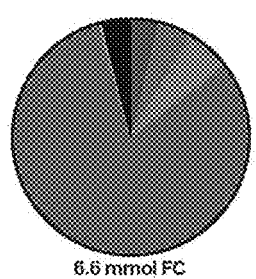 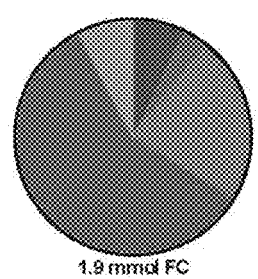
Figures 11A-E

ELECTROLYSIS ELECTRODE AND METHODS OF MANUFACTURE AND USING SAME IN WATER PURIFICATION SYSTEM

CROSS REFERENCE TO RELATED APPLICATIONS

This Application claims the benefit of U.S. Provisional Patent Application Ser. No. 62/380,150, filed on Aug. 26, 2016, which is incorporated by reference herein in its entirety.

TECHNICAL FIELD

The present invention generally relates to electrolysis, and more particularly, to electrodes for water treatment electrolysis and the chlor-alkali industry.

BACKGROUND

Systems are being proposed for the electrochemical oxidation of pollutants in an electrolyte. Examples of these systems include wastewater treatment systems that employ electrolysis to clean wastewater. These systems apply a voltage potential between an anode and a cathode that are in each contact with the wastewater to achieve electrochemical oxidation of organic matter.

The anodes in these systems often have a layer of semiconductor that contacts the wastewater. The semiconductor often includes one or more components that dissolve into the wastewater during operation of the system. Dissolution of the semiconductor components reduces the service life of the anode.

Further, the ability of some of the anodes to purify water depends on the ability of the anode to generate Reactive Chlorine Species (RCS) in the water. However, known anodes typically generate reactive chlorine species at current efficiencies that are too low to be desirable for some wastewater treatment applications. Anodes that efficiently generate RCS are also useful in the chlor-alkali process and industry.

Accordingly, improvements in electrolysis anodes are desirable that increase the service life of electrolysis anodes and their current efficiency of RCS generation.

SUMMARY

An electrolysis anode has a first conductive metal oxide layer, a second semiconductor layer contacting the first conductive metal oxide layer, and one or more islands of a third semiconductor contacting the second semiconductor layer. In accordance with an exemplary embodiment of the anode, the first conductive metal oxide layer includes iridium, the second semiconductor layer includes titanium oxide, and the third semiconductor includes tin oxide.

In accordance with another exemplary embodiment, the electrolysis anode may include a titanium base, an $Ir_{0.7}Ta_{0.3}O_2$ layer formed on the titanium base, a cobalt doped $TiO_2$ layer formed on the $Ir_{0.7}Ta_{0.3}O_2$ layer, and a plurality of islands of $SnO_2$ formed on the Co—$TiO_2$ layer.

The anode may be manufactured using spray pyrolysis to apply each semiconductor material.

The anode can be used in systems that purify water having organic pollutants and ammonia. The anode may be configured such that when placed in water at least a portion of the second semiconductor layer and the islands are in direct physical contact with the water.

A method of operating a water treatment system for electrolysis of water includes contacting the anode with water that includes chloride, and applying to the anode an anodic potential that is sufficient to generate reactive chlorine at the anode.

The disclosure also describes a water purification system including an anode having a first conductive metal oxide layer and a second semiconductor layer contacting the first conductive metal oxide layer. The second layer is configured to be, at least in part, in direct contact with water that includes chloride. The anode also includes and one or more islands of a third semiconductor contacting the second semiconductor layer. The third semiconductor islands are also configured to be in direct contact with the water.

The disclosure provides an electrolysis anode, comprising a first conductive metal oxide layer; a second semiconductor layer contacting the first conductive metal oxide layer; and one or more islands of a third semiconductor contacting the second semiconductor layer. In one embodiment, the first conductive metal oxide layer includes Iridium. In a further embodiment, the first conductive metal oxide layer includes $Ir_{0.7}Ta_{0.3}O_2$. In yet a further embodiment, a mass loading of $Ir_{0.7}Ta_{0.3}O_2$ in the first conductive metal oxide layer is a value selected from the group consisting of about 0.3 mg/cm² and about 0.05 mg/cm². In another embodiment, the second semiconductor layer includes $TiO_2$. In a further embodiment, the second semiconductor layer includes cobalt doped titanium oxide. In yet another embodiment, the third semiconductor is antimony doped tin dioxide or tin dioxide. In another embodiment, the anode further comprises a metal conductor contacting the first conductive metal oxide layer. In a further embodiment, the metal conductor is titanium. In still a further embodiment, the first conductive metal oxide layer is configured to overcome a Schottky barrier between the second semiconductor layer and the metal conductor.

The disclosure also provides an electrolysis anode, comprising a titanium base; a $Ir_{0.7}Ta_{0.3}O_2$ layer formed on the titanium base; a Co—$TiO_2$ layer formed on the $Ir_{0.7}Ta_{0.3}O_2$ layer; and a plurality of islands of $SnO_2$ formed on the Co—$TiO_2$ layer. In one embodiment, a mass loading of $TiO_2$ in the Co—$TiO_2$ layer is about 0.5 mg/cm²; wherein a mass loading of $SnO_2$ in the islands of $SnO_2$ is about 1.0 mg/cm²; and wherein a mass loading of $Ir_{0.7}Ta_{0.3}O_2$ layer is a value selected from the group consisting of about 0.3 mg/cm² and about 0.05 mg/cm². In another embodiment, each of the islands of $SnO_2$ has a discrete surficial area formed over the Co—$TiO_2$ layer.

The disclosure also provides a water purification system, comprising an anode including a first conductive metal oxide layer, a second semiconductor layer contacting the first conductive metal oxide layer and configured to be, at least in part, in direct contact with water that includes chloride, and one or more islands of a third semiconductor contacting the second semiconductor layer and configured to be in direct contact with the water. In one embodiment, the system further comprises a metal conductor contacting the first conductive metal oxide layer. In a further embodiment, the metal conductor is titanium. In yet another embodiment, the system further comprises a cathode. In a further embodiment, the cathode is stainless steel. In another embodiment, the system further comprises a current source connected to the cathode and anode. In yet another embodiment, the first conductive metal oxide layer includes Iridium. In a further embodiment, the first conductive metal oxide layer includes $Ir_{0.7}Ta_{0.3}O_2$. In yet another embodiment, the second semiconductor layer includes $TiO_2$. In a further embodiment, the second semiconductor layer includes cobalt doped titanium oxide. In still another embodiment, the third semiconductor is tin dioxide or antimony doped tin dioxide. In yet another embodiment, the system further comprise an electrolysis tank for holding the water, anode and a cathode.

The disclosure also provides a method of operating a water purification system, comprising contacting an anode with water that includes chloride; and applying to the anode an anodic potential that is sufficient to generate reactive chlorine at the anode, the anode including a first conductive metal oxide layer, a second semiconductor layer contacting the first conductive metal oxide layer and configured to be, at least in part, in direct contact with the water, and one or more islands of a third semiconductor contacting the second semiconductor layer and configured to be in direct contact with the water. In one embodiment, the first conductive metal oxide layer includes $Ir_{0.7}Ta_{0.3}O_2$. In another embodiment, the second semiconductor layer includes cobalt doped titanium oxide. In still another embodiment, the third semiconductor is antimony doped tin dioxide or tin dioxide.

The disclosure also provides a method of manufacturing an electrolysis anode for water treatment, comprising heating a metal electrode to a first predetermined temperature; depositing a first conductive metal oxide layer on the heated metal electrode by applying a first aqueous metal oxide precursor onto the heated metal electrode using spray pyrolysis; depositing a second semiconductor layer on the first conductive metal oxide layer by applying a second aqueous metal oxide precursor onto the first conductive metal oxide layer using spray pyrolysis; and depositing a third semiconductor on the second semiconductor layer by applying a third aqueous metal oxide precursor onto the second semiconductor layer using spray pyrolysis. In one embodiment, the first aqueous metal oxide precursor includes a solution of 3.5 mM $IrCl_3$ and 1.5 mM $TaCl_5$ dissolved in isopropanol. In another or further embodiment, the second aqueous metal oxide precursor includes a solution of 25 mM titanium-glycolate complex prepared by a hydroxo-peroxo method and a dopant precursor $Co(NO_3)_2$ at a molar fraction of 0.1. In still another or further embodiment, the third aqueous metal oxide precursor includes a solution of 25 mM $SnCl_4$ dissolved in isopropanol. In yet another embodiment, the metal electrode is titanium. In another embodiment, the method further comprises etching the metal electrode in a 10% HF solution prior to heating. In still another embodiment, the method further comprises annealing each of the first conductive metal oxide layer, second semiconductor layer, and the third semiconductor at a second predetermined temperature. In yet another embodiment, the method further comprises annealing the electrolysis anode after depositing first conductive metal oxide layer, second semiconductor layer, and the third semiconductor. In one embodiment, the third semiconductor forms into discrete islands on the second semiconductor layer.

The disclosure also provides a chlor-alkali process, comprising contacting an anode with NaCl brine; and applying to the anode an anodic potential that is sufficient to generate reactive chlorine at the anode, the anode including a first conductive metal oxide layer, a second semiconductor layer contacting the first conductive metal oxide layer and configured to be, at least in part, in direct contact with the brine, and one or more islands of a third semiconductor contacting the second semiconductor layer and configured to be in direct contact with the brine.

The foregoing summary does not define the limits of the appended claims. Other aspects, embodiments, features, and advantages will be or will become apparent to one with skill in the art upon examination of the following figures and detailed description. It is intended that all such additional features, embodiments, aspects, and advantages be included within this description and be protected by the accompanying claims.

BRIEF DESCRIPTION OF THE FIGURES

It is to be understood that the drawings are solely for purpose of illustration and do not define the limits of the appended claims. Furthermore, the components in the figures are not necessarily to scale. In the figures, like reference numerals designate corresponding parts throughout the different views.

FIGS. 8A-B are graphs showing example experimental results of BA electrolysis using the disclosed anodes.

FIG. 9 is a schematic illustration of a reactive species generation mechanism of an anode.

FIGS. 10A-C are graphs comparing the experimental results of wastewater treatment using the disclosed anodes and a prior anode.

FIGS. 11A-E are graphs showing the chlorine evolution rate for the disclosed anodes under different electrolyte conditions and showing the consumption of reactive chlorine generated by the disclosed anodes during experiments treating wastewater.

DETAILED DESCRIPTION

Figure 1:
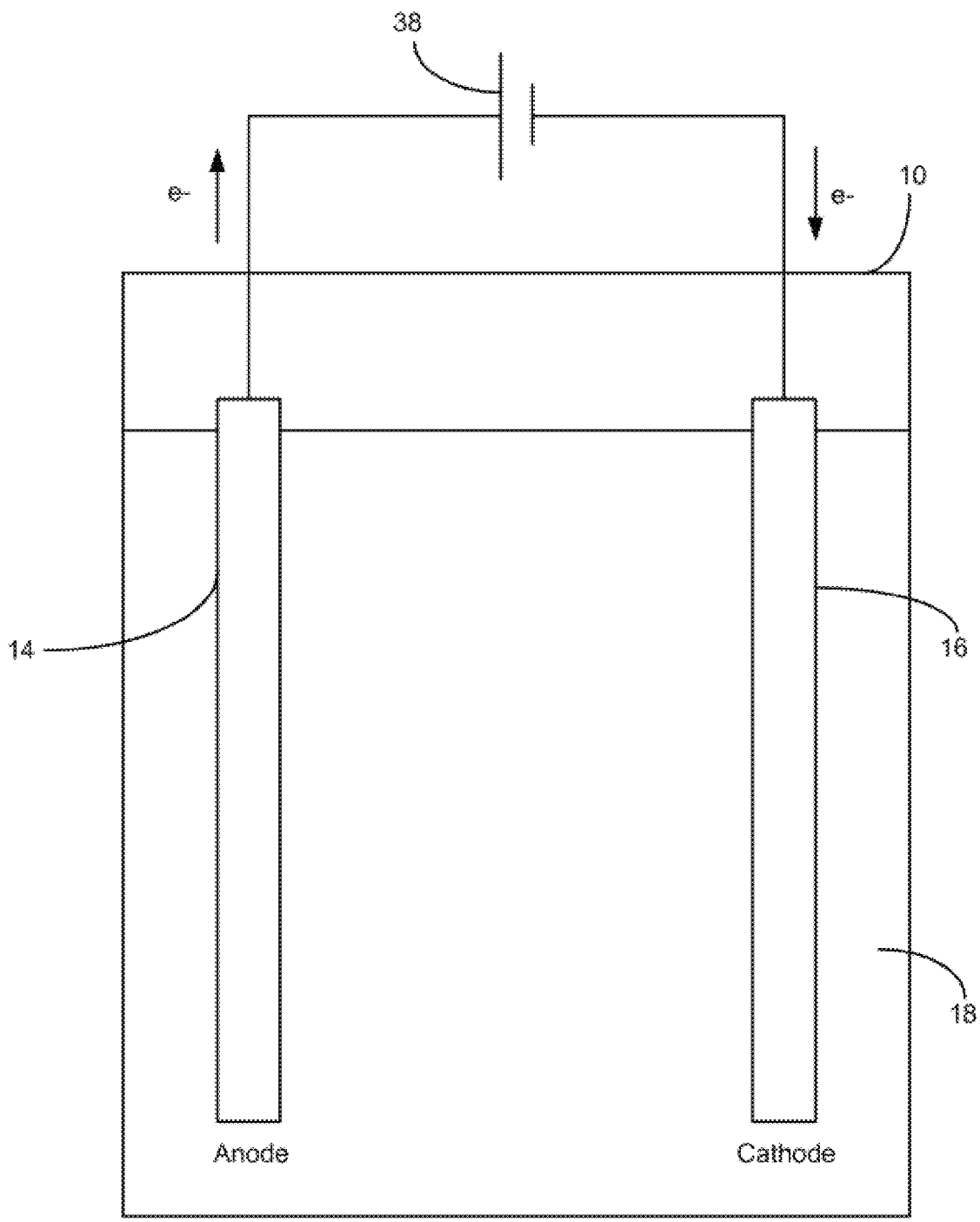
FIG. 1 illustrates an exemplary electrolysis system employing the anode.

The following detailed description, which references to and incorporates the drawings, describes and illustrates one or more examples of electrolysis electrodes, water treatment systems, and methods of using electrolysis electrodes and water treatment systems, and of manufacturing electrolysis electrodes. These examples, offered not to limit but only to exemplify and teach embodiments of inventive electrodes, methods, and systems, are shown and described in sufficient detail to enable those skilled in the art to practice what is claimed. Thus, where appropriate to avoid obscuring the invention, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Although any methods and materials similar or equivalent to those described herein can be used in the practice or testing of the invention(s), specific examples of appropriate materials and methods are described herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Water scarcity has been recognized as an emerging global crisis. In order to facilitate water recycling and reuse, decentralized wastewater treatment has been proposed as a supplement to the conventional urban wastewater system. Electrochemical oxidation (EO) is usually more efficient than biological treatment and is often less expensive than homogeneous advanced oxidation processes. In addition, the compact design, ease of automation and small carbon footprint make it an ideal candidate for decentralized wastewater treatment and reuse.

The performance of EO is determined by the electrochemical generation of reactive species, which largely depends on the nature of anode materials. Non-active anodes with high overpotentials for oxygen evolution reaction (OER), such as those based on $SnO_2$, $PbO_2$, and boron-doped diamond (BDD), have been investigated in the previous decades. In spite of their superior current efficiency for hydroxyl radical ($\cdot$OH) generation, $SnO_2$ and $PbO_2$ anodes have poor conductivity and stability. The application of BDD anodes is hindered by their high cost and complicated fabrication. Conversely, Pt-group metal oxides (e.g., $RuO_2$ and $IrO_2$) are efficient and stable catalysts for OER, exhibiting high chlorine evolution reaction (CER) activity in the presence of chloride, although they are typically less efficient for hydroxyl radical generation. Hence, the development of durable anodes with high activity for both CER and radical generation is an ongoing challenge.

Electrolyte composition is another factor in EO performance. Previously, $\cdot$OH was considered as the main contributor to organic matter removal during EO. Recent studies have pointed out that carbonate, sulfate and phosphate radicals are also potent oxidants. Compared with these anions, chloride ($Cl^-$) in wastewater can be more readily oxidized to reactive chlorine species. Enhanced electrochemical oxidation of organic compounds observed in the presence of $Cl^-$ has been attributed to reaction with free chlorine ($Cl_2$, HOCl and $OCl^-$. More recent studies have suggested that $Cl\cdot$ and $Cl_2\cdot^-$ might be primarily responsible for organic compound degradation. However, direct experimental evidence verifying the presence or formation mechanism of these radicals during electro-chemical is lacking. A quantitative description of reactive species formation and reactivity in $Cl^-$ solutions during the electrochemical oxidation of organic contaminants has not yet been fully elucidated.

Versatile SbSn/CoTi/Ir and Sn/CoTi/Ir heterojunction anodes with high activity for chlorine and radical generation are disclosed herein. A combination of experimental and kinetic modeling approaches are also disclosed that help explain anodic reactive species generation mechanisms and to model their steady-state concentrations in the electrolyte. The disclosed anodes represent an improvement over known heterojunction metal oxide anodes for electrolysis, and the modeling provides new insight into the mechanism of wastewater electrolysis.

FIG. 1 is a simplified illustration of a water purification system 8 that includes a vessel 10 for holding an electrolytic medium 18 such as wastewater, an anode 14 and cathode 16 for use in a wastewater electrolysis, and a voltage source 38 for providing current to the anode 14 and cathode 16. The system 8 can purify water having organic matters by making use of advanced oxidation processes (AOP) to break organic matters into small and stable molecules, such as water and $CO_2$. For the purposes of simplification, a single anode 14 and cathode 16 are illustrated, although additional anodes 14 and/or cathodes 16 can be employed.

The water purification system 8 can be used to purify wastewater. Wastewater includes the organic matters that are normally associated with waste products and chloride that is naturally present in urine. Accordingly, wastewater can naturally operate as the electrolytic medium 18 or an electrolyte, such as NaCl, can optionally be added to the wastewater.

Examples of the detailed construction of the anode 14 are described herein with reference to the other Figures. Generally, the anode 14 has a first conductive metal oxide layer, a second semiconductor layer contacting the first conductive metal oxide layer, and one or more islands of a third semiconductor contacting the second semiconductor layer. In accordance with an exemplary embodiment of the anode 14, the first conductive metal oxide layer includes iridium, the second semiconductor layer includes titanium oxide, and the third semiconductor includes tin dioxide. In accordance with another exemplary embodiment, the water purification anode 14 may include a titanium base, an $Ir_{0.7}Ta_{0.3}O_2$ layer formed on the titanium base, a Co—$TiO_2$ layer formed on the $Ir_{0.7}Ta_{0.3}O_2$ layer, and a plurality of islands of $SnO_2$ formed on the Co—$TiO_2$ layer. Alternatively, the islands may be made of $SnO_2$ doped with Sb.

The cathode 16 may be made of a suitable metallic conductor, such as stainless steel.

During operation of the water purification system 8, an anodic potential 38 is applied between the anode 14 and the cathode 16 at a level that is sufficient to generate reactive chlorine at the anode 14.

The anode 14 has a relatively high rate of Reactive Chlorine Species (RCS) generation. Since many wastewater electrolysis systems use RCS to degrade organic matters, the anodes 14 is highly suitable for use in these systems.

Figure 2:
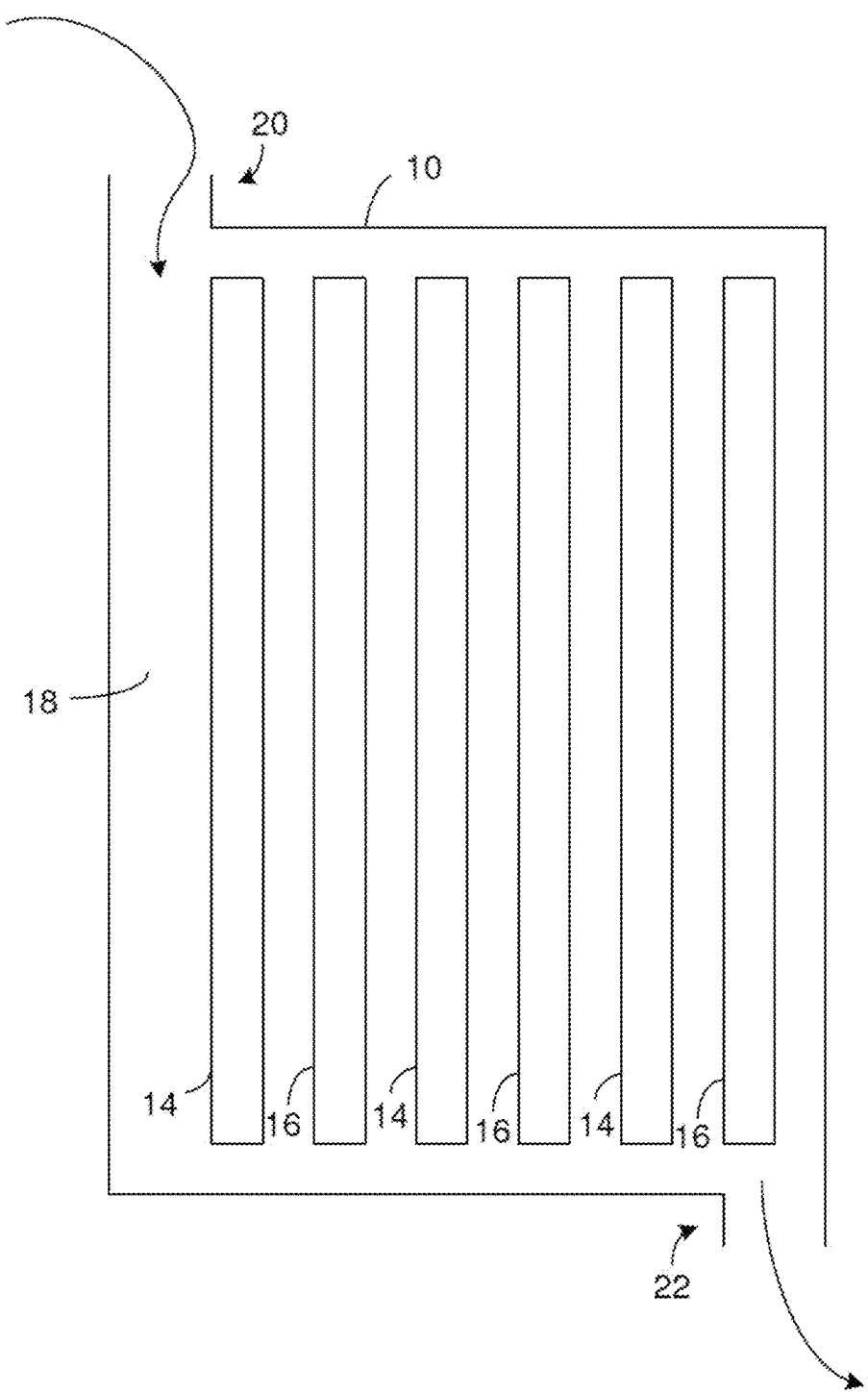
FIG. 2 illustrates a second exemplary electrolysis system such as a continuous water purification system.

FIG. 2 illustrates an example of another suitable electrolysis system 15 such as a water purification system that includes multiple anodes 14 and cathodes 16. The system includes a vessel 10 having a reservoir. Anodes 14 and cathodes 16 are positioned in the reservoir such that anodes 14 and cathodes 16 alternate with one another. The anodes 14 and cathodes 16 are parallel or substantially parallel with one another. An electrolytic medium 18 is positioned in the reservoir such that anodes 14 and the cathodes 16 are in contact with the electrolytic medium 18. The electrolytic medium 18 includes one or more electrolytes and can be a liquid, a solution, a suspension, or a mixture of liquids and solids. In one example, the electrolytic medium 18 is wastewater that includes organic matters, ammonia, and chloride (Cl⁻). The chloride can be present in the electrolytic medium 18 as a result of adding a salt to the electrolytic medium 18 or the electrolytic medium 18 can include urine that is a natural source of the chloride. The electrolysis system also includes a voltage source (not shown) configured to drive an electrical current through the anodes 14 and cathodes 16 so as to drive a chemical reaction in the electrolytic medium 18.

The electrolysis system illustrated in FIG. 2 includes an inlet 20 and an outlet 22. The electrolysis system can operate as a continuous reactor in that the electrolytic medium 18 flows into the reservoir through the inlet 20 and out of the reservoir through the outlet 22. Alternately, the electrolysis system can also be operated as a batch reactor. When the electrolysis system is operated as a batch reactor, the electrolytic medium 18 can be a solid, a liquid, or a combination.

Figure 3:
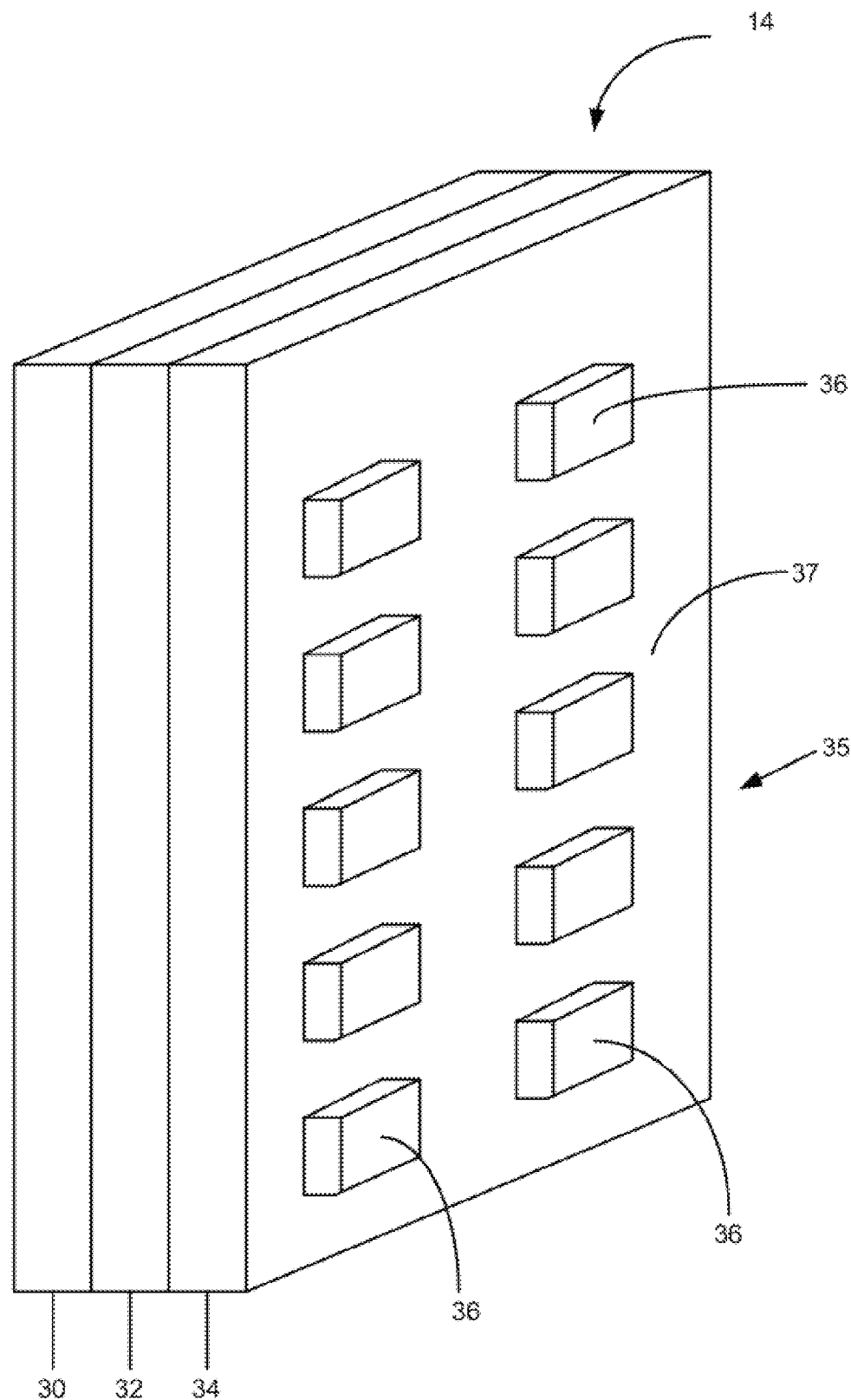
FIG. 3 is a conceptual perspective view showing of the anode of FIGS. 1 and 2.

FIG. 3 is a conceptual perspective view of an example construction of the anode 14. The anode includes a current collector 30 such as a metal base, a first conductive metal oxide layer 32, a second semiconductor layer 34, and islands of a third semiconductor 36.

The current collector 30 may be a sheet or foil, or alternatively, the current collector 30 can be a porous material such as a mesh or fabric. Suitable materials for the current collector 30 include valve metals, such as Ti.

The first conductive metal oxide layer 32 is located between the current collector 30 and the second semiconductor layer 34. The first semiconductor 32 contacts the second semiconductor 34 forming a heterojunction. The first semiconductor 32 also contacts the current collector 30. The first semiconductor 32 can serve one or more functions selected from the group consisting of passivating the current collector 30, serving as electron shuttle between the second semiconductor 34 and the current collector 30, and decreasing the ohmic resistance of the electron transfer between the second semiconductor 34 and the current collector 30. In some instances, direct contact between the current collector 30 and the second semiconductor 34 would result in a Schottky barrier to the transfer of electrons from the second semiconductor 34 to the current collector 30. The first semiconductor 32 can be selected such that the energy barrier for electron transfer from the second semiconductor 34 to the current collector 30 through the first semiconductor 32 is less than the energy barrier that would result from electron transfer from the second semiconductor 34 directly to the current collector 30.

The first semiconductor 32 can include, consist of, or consist essentially of a first metal oxide that includes, consists of, or consists essentially of oxygen, one or more electroactive metal elements and optionally one or more stabilizing elements. Examples of electroactive elements include, but are not limited to, Ir. Examples of stabilizing elements include, but are not limited to, Ta. Accordingly, the first semiconductor 32 can include, consist of, or consist essentially of a first metal oxide that includes, consists of, or consists essentially of oxygen, one or more electroactive metal elements such as Ir and one or more stabilizing elements such as Ta. As an example, the first metal oxide can include, consist of, or consist essentially of oxygen, iridium and one or more stabilizing elements such as Ta. In one example, the first metal oxide includes, consists of, or consists essentially of oxygen, iridium and tantalum. For instance, the first metal oxide can be $Ir_{0.7}Ta_{0.3}O_2$.

The second semiconductor layer 34 has an exposed surface area 35. In some instances, at least some of the surface area 37 is in direct physical contact with the electrolytic medium 18. The second semiconductor layer 34 is selected such that it, in combination with the semiconductor islands 36, enhances the evolution of reactive chlorine.

The second semiconductor layer 34 can include, consist of, or consist essentially of a second metal oxide that includes, consist of, or consist essentially of oxygen and one or more elements selected from group IV. In some instances, the second semiconductor layer 34 includes, consists of, or consists essentially of oxygen and titanium. For instance, the second semiconductor layer 34 can include, consist of, or consist essentially of cobalt doped titanium dioxide (Co—$TiO_2$).

The second semiconductor layer 34 is overcoated with discrete islands of a third semiconductor 36. The islands 36 are in contact with the second semiconductor layer 34 and may also contact the electrolytic medium 18 when the anode 14 is placed in an electrolysis system 8 or 15. The islands 36 may be formed over the second semiconductor layer 34 using spray pyrolysis.

The islands 36 can each include, consist of, or consist essentially of a third metal oxide that includes, consist of, or consist essentially of oxygen and one or more elements. In some instances, the third semiconductor islands 36 include, consists of, or consists essentially of oxygen and tin. For instance, the islands 36 can each include, consist of, or consist essentially of tin dioxide ($SnO_2$). Alternatively, as another example, the islands 36 can each include, consist of, or consist essentially of tin dioxide doped with antimony (Sb—$SnO_2$).

Figure 4:
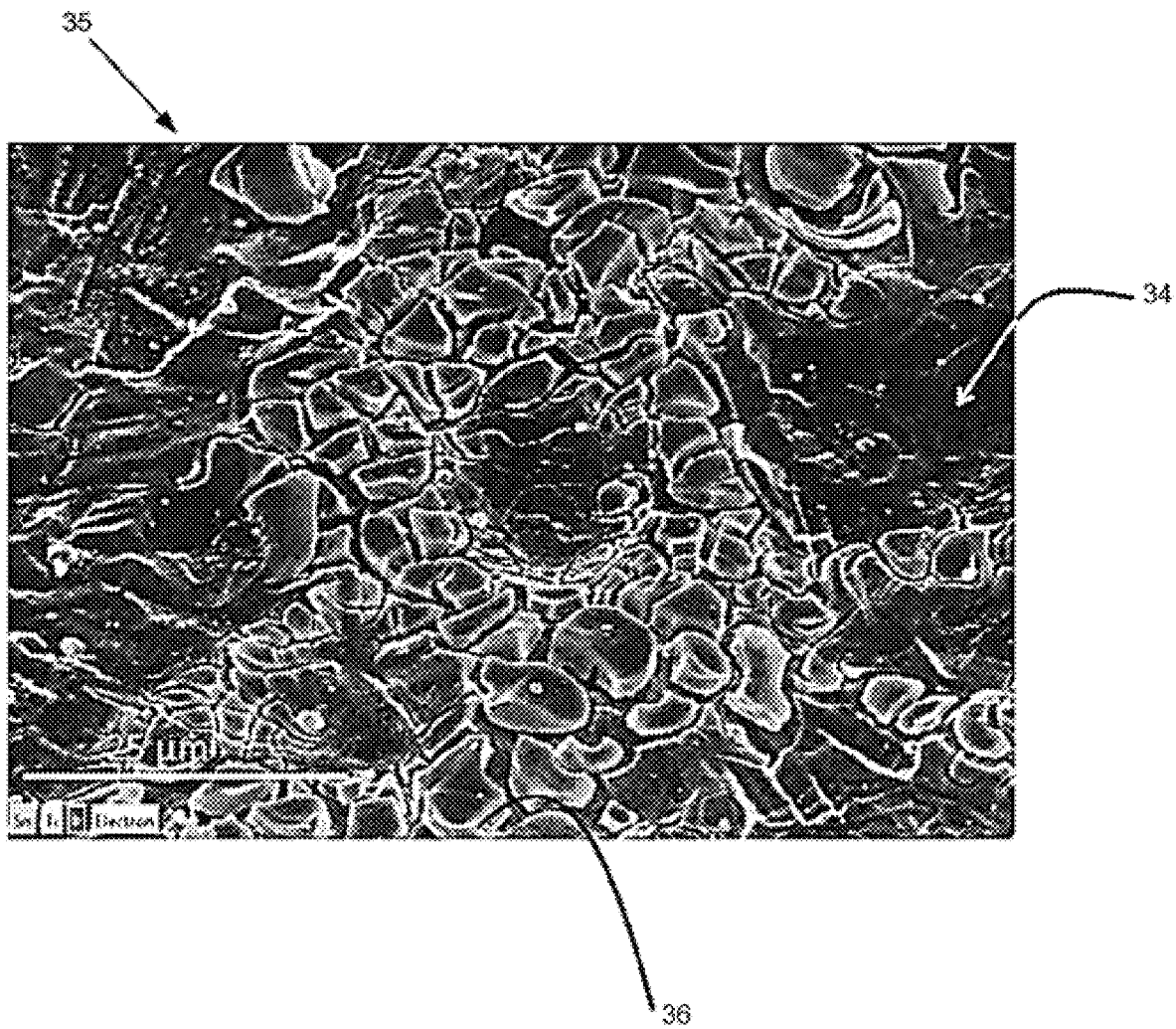
FIG. 4 is field emission scanning electron microscope (FESEM) image of the surface of an exemplary anode showing the islands and a semiconductor interlayer.
Figure 5:
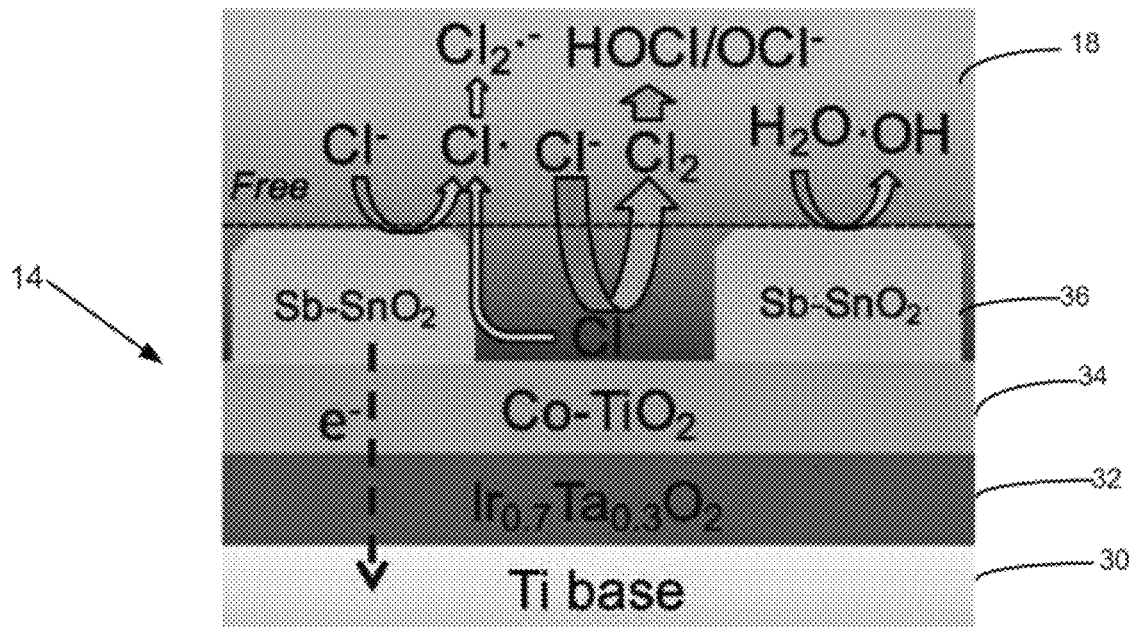
FIG. 5 is a conceptual cross-sectional view of an exemplary construction of the anode.

The islands may be discrete surficial deposits of a material on top of the second semiconductor layer, as shown in FIGS. 3-5. They may be physically separated from each other. In some instances, each island may have a general diameter of about 8 μM to 1 μM, or less. Although their coverage over the second semiconductor layer may be any suitable amount, in some instances, they may cover about 50% of the surface area of the second semiconductor layer. The islands 36 provide an active site for RCS and radical generation. Although shown in the example of FIG. 3 at regular spacing intervals and of the same size, the islands 36 do not necessarily have to be placed in this arrangements, and may have uneven spacing and different, irregular sizes relative to each other (e.g., FIG. 4). The number of islands 36 and their density on the second semiconductor layer 34 can be any suitable values.

The second semiconductor layer 34 and the overcoated third semiconductor islands 36 enhance the evolution of reactive chlorine. The surficial islands 36 also serve as the reactive sites for free radical generation.

During operation of the anode 14, an exposed face 35 of the anode 14, which includes at least some of the surface 37 of the second semiconductor layer 34 and the surficial third semiconductor islands 36, makes contact with the electrolytic medium 18. The sides and tops of the islands 36 can make contact with the electrolytic medium.

FIG. 5 is a conceptual cross-sectional view of an exemplary construction of the anode 14. In this example, the current collector 30 is Ti foil. The first conductive metal oxide layer 32 is a layer of $Ir_{0.7}Ta_{0.3}O_2$ formed over the Ti foil using a spray pyrolysis method described herein below. The second semiconductor layer 34 is a layer of cobalt doped titanium dioxide (Co—$TiO_2$) formed over the $Ir_{0.7}Ta_{0.3}O_2$ layer using spray pyrolysis, as described below. And the third semiconductor islands 36 are islands of Antimony doped tin dioxide (Sb—$SnO_2$) formed over the Co—$TiO_2$ layer 34. The current flow e⁻ through the layers 26-30 is also depicted.

FIG. 5 shows the active sites on the anode where reactive species are formed. For example, FIG. 5 illustrates the chlorine cycle where chloride is oxidized at the anode surface so as to generate Reactive Chlorine Species (RCS). Reactive chlorine species are free chlorine plus chlorine radicals. Examples of free chlorine include, but are not limited to, $Cl_2$, HOCl, and $ClO^-$. Examples of chlorine radicals include, but are not limited to, Cl·; and the radical ion $Cl_2·^-$.

As shown in FIG. 5, in one example of the RCS generation, the $Sb$—$SnO_2$ islands 36 promote the one-electron oxidation of $Cl^-$ to produce free Cl· into the electrolytic medium 18. The atomic chlorine radical (Cl·) can interact with chloride in the medium 18 to form the radical ion $Cl_2·^-$. The radical ion $Cl_2·^-$ can be reduced at the cathode surface to generate two chlorides in the electrolytic medium 18. The exposed surfaces of the Co—$TiO_2$ layer 34 generate Cl· and $Cl_2$. This in turn generates HOCl in the electrolytic medium 18. The HOCl is an acid (hypochlorous acid) that accordingly partially dissociates into a proton ($H^+$) and hypochlorite ($ClO^-$) in the electrolytic medium 18. Hypochlorite and water can react at the surface of the cathode 16 to generate a chloride and a hydroxyl ion that each receives an electron from the cathode 16. The hypochlorous acid, hypochlorite, atomic chlorine radical, and radical ion $Cl_2·^-$ serve as Reactive Chlorine Species (RCS).

The invention may also be illustrated by the following examples, which are provided by way of illustration and are not intended to be limiting.

EXAMPLES

Example 1

A first anode was prepared. A clean Ti metal foil acted as a base that served as a current collector (e.g., 1 cm×1.5 cm). The Ti base was polished with sand paper and etched in 10% HF solution for one minute. Metal oxide layers were then deposited on the cleaned Ti surfaces by spray pyrolysis.

Using spray pyrolysis, aqueous metal oxide precursors were atomized with 5 psi air and sprayed onto the heated (e.g., 300° C.) Ti metal base. The resulting oxide film was then annealed at 500° C. for ten minutes. This procedure was repeated to reach the desired mass loading for each semiconductor layer. After the desired mass loading was reached for a layer, a final annealing was done at 500° C. for one hour.

Concerning the precursors for each semiconductor layer, the $Ir_{0.7}Ta_{0.3}O_2$ layer precursor contained 3.5 mM $IrCl_3$ and 1.5 mM $TaCl_5$ in isopropanol. The $TiO_2$ precursor contained 25 mM titanium-glycolate complex prepared by a hydroxoperoxo method. A dopant precursor, $Co(NO_3)_2$, was added to the $TiO_2$ precursor at a molar fraction of 0.1. The $Sb$—$SnO_2$ precursor contained 25 mM $SnCl_4$ and 1.24 mM $SbCl_3$ dissolved in isopropanol.

As referred to herein, anodes with only an $Ir_{0.7}Ta_{0.3}O_2$ layer are denoted as Ir for simplicity. Multilayer anodes with $Sb$—$SnO_2$ islands, a Co doped $TiO_2$ layer and an $Ir_{0.7}Ta_{0.3}O_2$ layer are denoted as SbSn/CoTi/Ir. Anodes without $Sb$—$SnO_2$ doping are denoted as CoTi/Ir (with Co-doping) or Ti/Ir (without Co-doping).

The mass loadings of $Ir_{0.7}Ta_{0.3}O_2$, $TiO_2$ and $SnO_2$ was 0.3, 0.5, and 1.0 mg/$cm^2$, respectively. Other mass loadings, including those around the foregoing values (e.g., ±25%), may alternatively be used.

X-ray photoelectron spectroscopy (XPS) was performed on the first anode using a Surface Science M-Probe ESCA/XPS. Morphologies and elemental composition were obtained with a ZEISS 1550VP field emission scanning electron microscope (FESEM) equipped with an Oxford X-Max SDD X-ray energy-dispersive spectrometer (EDS).

Morphologies of anodes prepared by spray pyrolysis were denser and smoother than the "cracked-mud" texture typical of brush-coated anodes. Element mapping also indicated better dispersion of sublayer Ir, top-layer Ti and Co dopant for anodes prepared by spray pyrolysis.

FIG. 4 is field emission scanning electron microscope (FESEM) image of the surface 35 of an exemplary first anode 14 showing the islands 36 and a semiconductor interlayer 34. Deposition of $Sb$—$SnO_2$ produced isolated islands 36 on top of the Co—$TiO_2$ layer 34 instead of a thin film (FIG. 4). This is in agreement with previously reported morphologies of $Sb$—$SnO_2$ anodes prepared by spray pyrolysis. $Sb$—$SnO_2$ islands were determined to be in the range of 2-4 μm high and were located on top of a 0.5 μm Co—$TiO_2$ layer overlying a 0.5 μm $Ir_{0.7}Ta_{0.3}O_2$ layer. $IrO_2$ from the first layer 32 may thermally diffuse into the $TiO_2$ layer 34.

The CoTi/Ir anode surface 34 was primarily composed of $TiO_2$, as evidenced by loss of distinctive iridium oxide peaks in XPS spectra (62 and 65 eV) within $TiO_2$ or Co—$TiO_2$ coating layers. The Ti 2p peaks of CoTi/Ir shifted to slightly lower binding energies compared with that of CoTi without an $IrO_2$ under-layer. This shift was ascribed to charge transfer from $IrO_2$ to $TiO_2$, since $IrO_2$ has a higher work function than $TiO_2$. This interaction indicates that the $IrO_2$ layer acts as an electron shuttle to overcome the Schottky barrier between the Co—$TiO_2$ layer and the Ti base. Electron transfer is thus facilitated, based on the observed reduction of the charge transfer resistance ($R_{ct}$) of anodes containing Ir (i.e., $R_{ct}$ was reduced from 122 kΩ for CoTi to 4 kΩ for CoTi/Ir).

The properties of the $TiO_2$ layer can be modified by metal ion doping. Cobalt (Co) doping significantly increased the fraction of oxygen vacancies (531-533 eV) versus lattice oxygen (529-531 eV). This shift reflected the weakening of the oxygen binding energies of CoTi/Ir versus Ti/Ir.

The Ir anode exhibited an onset potential of 1.32 V at 1 mA/$cm_2$ during linear sweep voltammetry in 30 mM NaCl, corresponding to a 0.5 V overpotential for oxygen evolution (0.82 V at pH 7). This is comparable to overpotentials previously reported for nanocrystalline $IrO_2$ catalysts. While the $TiO_2$ or Co—$TiO_2$ coatings barely affected the onset potential, deposition of $Sb$—$SnO_2$ raised the onset potential to 1.38 V, which closely matches the chlorine evolution reaction (CER) potential (1.36 V). The observed shift in onset potential was likely due to inhibition of oxygen evolution reaction (OER), as evidenced by a decrease in the electrochemically active surface area for OER of SbSn/CoTi/Ir versus Ir anodes. Although the Co—$TiO_2$ interlayer only slightly affected the OER onset potential, it was crucial for inhibition of OER activity. Without a Co—$TiO_2$ coating the $Ir_{0.7}Ta_{0.3}O_2$ layer had access to electrolyte through cracks among the $Sb$—$SnO_2$ islands, increasing the electrochemically active surface area for OER and lowering the onset potential.

Example 2

A second anode was prepared using the spray pyrolysis method described in Example 1. The second anode is denoted herein as SbSn/CoTi/Ir*. The difference between the first and second example anodes is that with the second anode the $Ir_{0.7}Ta_{0.3}O_2$ mass loading was reduced to about 0.05 mg/cm².

An 83% reduction in the mass loading of $Ir_{0.7}Ta_{0.3}O_2$ (SbSn/CoTi/Ir*) resulted in a relatively inactive second anode, based on its high onset potential (1.56 V) and low electrochemically active surface area for OER. The second anode exhibited an onset potential of 1.56 V at 1 mA/cm² during linear sweep voltammetry in 30 mM NaCl.

In addition, the mass loading of $Ir_{0.7}Ta_{0.3}O_2$ affects overall anode stability. Accelerated lifetime tests showed that the lifetime of SbSn/CoTi/Ir* anode at 25 mA/cm² was 720 hours while that of SbSn/CoTi/Ir could be up to four years.

Accelerated lifetime tests (ALT) were conducted at a current density of 1.2 A/cm² in 1 M $NaClO_4$. In ALT tests, anode samples with a surface area of 0.25 cm² were subjected to 300 mA current, resulting a high current density of 1.2 A/cm². The purpose of the ALT is to test electrodes under a harsh galvanostatic condition to accelerate the dissolution or detachment of the electro active layer. Deactivation will be reflected by a sharp increase in cell voltage ($E_{cell}$). The electrode is considered to be deactivated when the cell voltage reaches 9 V because above this voltage the Ti metal base will be corroded. On the basis of lifetimes ($t_{Acc}$) observed from ALT at high current ($I_{Acc}$=1.2 A/cm²), the actual lifetime (t) at operational current (I) can be estimated by the empirical equation:

$$T = (I_{Acc}^{1.7} * t_{Acc})/I^{1.7} \quad \text{(Eq. 1)}$$

The $t_{Acc}$ of SbSn/CoTi/Ir* and SbSn/CoTi/Ir is 0.5 and 52 hours, respectively, which gives the lifetimes as 360 hours and 37,507 hours (about 4.3 years), respectively, at 25 mA/cm².

Example 3

A third anode was prepared using the same procedure described above in Example 1, but forming islands of undoped tin dioxide ($SnO_2$) instead of Sb—$SnO_2$ islands. The $SnO_2$ precursor contained either 25 mM $SnCl_4$ or $SnCl_2$ dissolved in isopropanol, and were applied with the same mass loading and annealed in the same manner as Example 1.

Example 4

The SbSn/CoTi/Ir anode (first anode) and the SbSn/CoTi/Ir* anode (second anode) were tested by using them to perform electrolysis under controlled conditions using different electrolytes and also by applying them to electrochemically treat human wastewater. With wastewater testing, test results show that chemical oxygen demand (COD) and $NH_4^+$ can be removed after two hours of electrolysis with minimal energy consumption (370 kWh/kg COD and 383 kWh/kg $NH_4^+$) using the first anode. Although free radical species contribute to COD removal, the disclosed anodes enhance reactive chlorine production and are thus more effective than those designed to enhance free radical production.

Testing and experiments coupled with computational kinetic simulations show that while ·OH and Cl· were initially produced on the SbSn/CoTi/Ir anode (first anode) exposed surface 35, the dominant radical formed in solution is the dichlorine radical anion, $Cl_2 \cdot^-$. The steady-state concentration of reactive radicals (e.g., ·OH) is ten orders of magnitude lower than that of reactive chlorine.

To carry out the testing, an example electrolysis cell (reactor) similar to that shown in FIG. 1 was constructed. The cell included an anode in parallel with a stainless steel cathode (e.g., 2×1.5 cm²) with a 5 mm separation between the anode and cathode. The cell used different electrolytes for different tests. For cells using a NaCl electrolyte, voltages were controlled versus a Ag/AgCl/Saturation NaCl reference electrode (for example, available from BASI, Inc.). For cells using a $Na_2SO_4$ electrolyte, voltages were controlled versus a $Hg/Hg_2SO_4$ reference electrode (e.g., available from Gamry Instruments).

Electro-chemical double layer capacitances ($C_{dl}$) of the cells were measured by cyclic voltammetry (0.1 V window centered on the open-circuit potential) in the non-Faradaic range in static 30 mM $Na_2SO_4$ solution at various scan-rate (0.005-0.8 V/s). Electro-chemical impedance spectroscopy (EIS) measurements were made in a static 30 mM NaCl electrolyte. The amplitude of the sinusoidal wave was 10 mV with frequencies ranging from 0.1 Hz to 100 kHz. EIS spectra were fitted by considering the Helmholtz layer of the anode as a Randles circuit that includes solution resistance, charge transfer resistance ($R_{ct}$) and capacitance.

Electrolysis using the first and second anodes, as well as comparative anodes was performed. The first and second anodes were preconditioned in 30 mM NaCl at 25 mA/cm₂ for one hour before use in a reactor. The uncompensated resistance ($R_u$) of the cell was measured by current interruption with a 200 mA current bias. All anodic potentials were adjusted for $R_u$ and were reported versus the normal hydrogen electrode (NHE). All electrolysis experiments were in galvanostatic mode with current density of 25 or 50 mA/cm₂. CER tests were conducted by galvanostatic electrolysis of 30 mM NaCl solution. Samples were taken at two minute intervals over 15 minutes.

Total chlorine (TC) and free chlorine (FC) concentrations were measured using DPD (N,N-diethyl-p-phenylenediamine) reagent (Hach method 10101 and 10102). Chlorine evolution rate and current efficiency (CE) were calculated. Electrolysis of benzoic acid (BA) was performed galvanostatically. BA was chromatographically separated using a Zorbax XDB column with 10% acetonitrile and 90% 0.1% formic acid as eluent.

Figure 6:
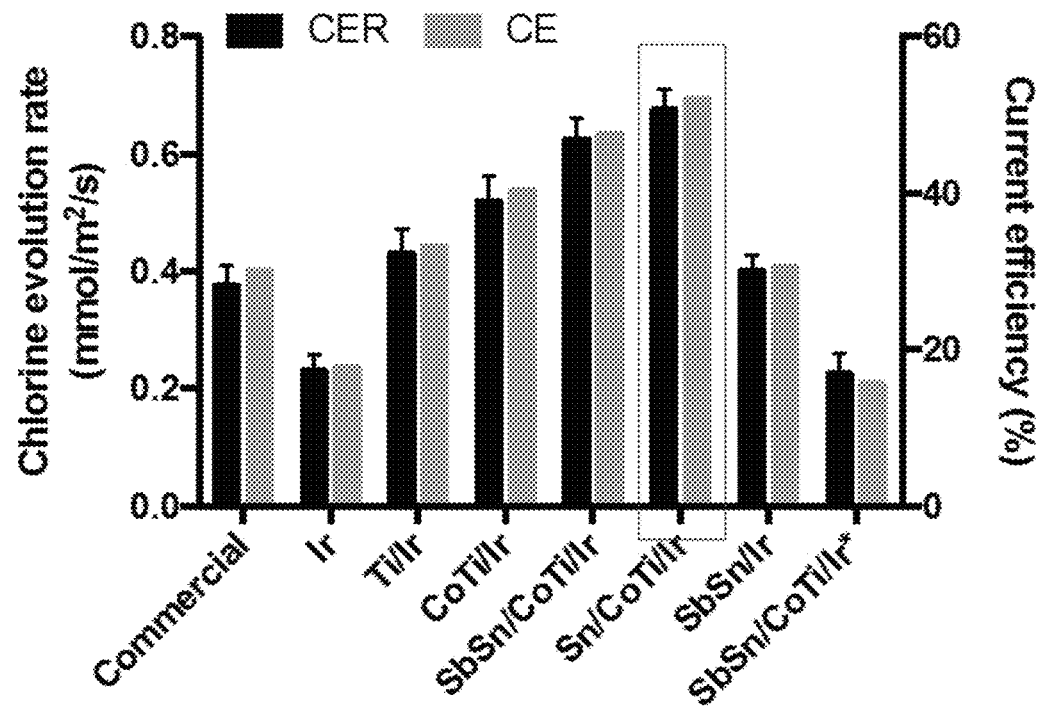
FIG. 6 is a graph comparing the chlorine evolution rate and current efficiency of the disclosed anodes with prior anodes.

Chlorine evolution of the first and second anodes during electrolysis was significantly improved due to their structure. Coating the Ir anode with $TiO_2$ significantly increased chlorine evolution reaction (CER) activity and current efficiency during electrolysis of 30 mM NaCl solutions, as shown by the graph of FIG. 6. FIG. 6 shows the chlorine evolution rate and current efficiency for certain comparative known anodes and the first, second and third anodes measured in 30 mM NaCl at 25 mA/cm². The anodic potentials for each anode are shown as numbers above each bar. Error bars at the tops of the bars represent standard deviation. The increase in CER activity resulted from interaction between the top $TiO_2$ layer and the $Ir_{0.7}Ta_{0.3}O_2$ sublayer, as only $TiO_2$ sites were exposed, and $TiO_2$ anodes without an $Ir_{0.7}Ta_{0.3}O_2$ sublayer had no CER activity (data not shown). The commercial anode indicated in FIG. 6 and discussed herein was a commercially available $IrO_2$-based CER anode purchased from Nanopac of Korea, used for comparisons with the disclosed anodes.

It is generally accepted that CER follows the Volmer-Heyrovsky (V-H) mechanism. The Volmer step includes the adsorption of Cl— and the discharge of an electron:

$$MO_x + Cl^- \rightarrow MO_x(Cl \cdot) + e^- \quad \text{(Eq. 2)}$$

In the Heyrovsky step, the adsorbed Cl· combines with Cl⁻ from the bulk electrolyte and releases $Cl_2$:

$$MO_x(Cl·)+Cl^-\rightarrow MO_x+Cl_2+e^- \quad (Eq.\ 3)$$

The recombination of two Cl· via the Volmer-Tafel reaction can also produce $Cl_2$:

$$2MO_x(Cl·)\rightarrow 2MO_x+Cl_2 \quad (Eq.\ 4)$$

Catalysts with optimal oxygen binding energies for OER normally have high activity for CER, resulting in competition between OER and CER. However, density functional theory (DFT) calculations by others have shown that selectivity toward CER can be enhanced by a monolayer $TiO_2$ coating above $RuO_2$, slightly increasing the energy barrier for CER, but drastically raising the energy barrier for OER. Consistent with these calculations, the $TiO_2$ coating applied onto $IrO_2$, which has a similar oxygen binding energy to $RuO_2$, significantly increased the current efficiency for chlorine production. Thus, the decreased active surface area for OER and increased OER onset potential provided by the $TiO_2$ overcoating on the $Ir_{0.7}Ta_{0.3}O_2$ layer significantly improves the CER of the first and second anodes.

At the molecular level, the desorption of Cl· (Eqs. 3 and 4) is considered to be the rate-limiting step of CER. Considering the positive linear relationship between oxygen binding energy and chlorine binding energy, lowering the oxygen binding energy by Co doping of the $TiO_2$ layer may facilitate Cl· desorption, enhancing the CER activity of CoTi/Ir compared with that of Ti/Ir.

Based on the inhibition of OER by $TiO_2$ and Co—$TiO_2$ coatings in the anodes, Ti/Ir and CoTi/Ir anodes exhibited increased CERs compared to Ir anodes (FIG. 6). However, the lower conductivity of Sb—$SnO_2$ islands resulted in higher operating anodic potentials. The relatively inferior performances of SbSn/Ir and SbSn/CoTi/Ir* anodes indicates that the absence of a CoTi layer or a reduction in Ir mass loading was detrimental to CER activity. In general, the CER activities of CoTi/Ir and SbSn/CoTi/Ir were higher that of commercial anodes (FIG. 6).

Figure 7A:
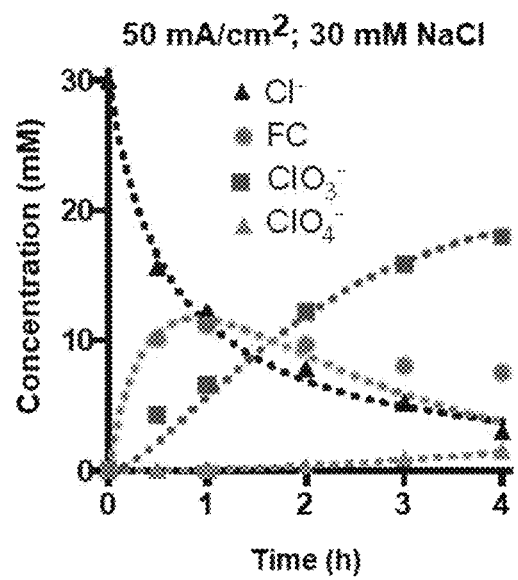
FIGS. 7A-E are graphs showing example experimental results of electrolysis using the disclosed anodes.
Figure 7B:
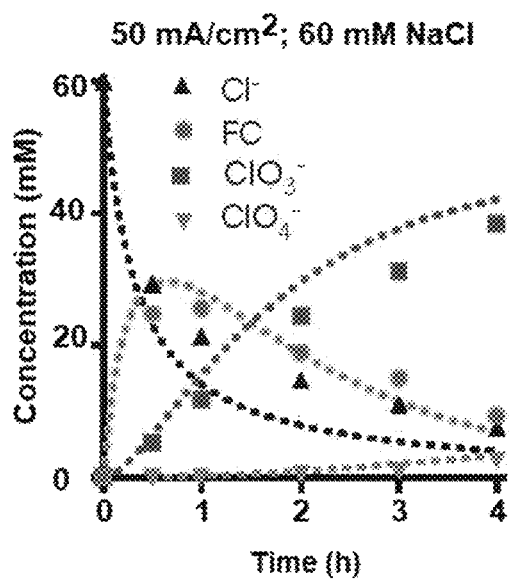
Figure 7C:
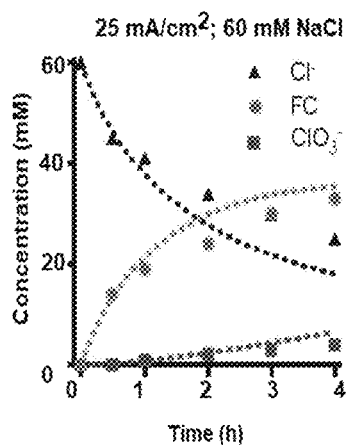
Figure 7D:
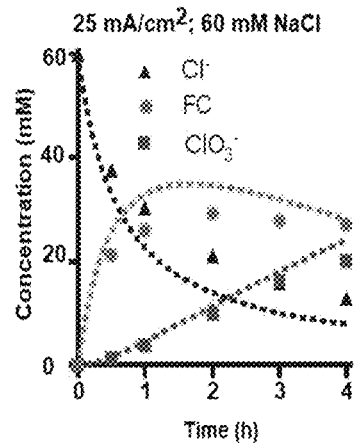
Figure 7E:
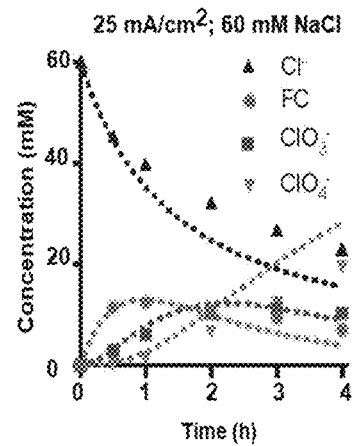

FIGS. 7a-e are graphs showing example experimental results of electrolysis using the disclosed anodes. FIGS. 7A and 7B show, respectively, the results of electrolysis of 30 mM NaCl (FIG. 7A) and 60 mM NaCl (FIG. 7B) using the SbSn/CoTi/Ir anode (first anode) at 50 mA/cm². FIG. 7C shows electrolysis of 60 mM NaCl at 25 mA/cm² using a CoTi/Ir anode. FIG. 7D shows electrolysis of 60 mM NaCl at 25 mA/cm² using the SbSn/CoTi/Ir anode (first anode). FIG. 7E shows electrolysis of 60 mM NaCl at 25 mA/cm² using the SbSn/CoTi/Ir* anode (second anode). Symbols in the graphs represent the experimental data, and the dashed lines represent predicted model result, except for FIG. 7D, where the dashed lines represent model fitting results.

Electrolysis of NaCl solutions with CoTi/Ir anodes resulted in gradual loss of Cl⁻ with corresponding production of HOCl/OCl⁻ and $ClO_3^-$ (FIG. 7C). Similar results were observed with SbSn/CoTi/Ir anodes (FIGS. 7A, B, D) except with a higher production of $ClO_3^-$. Testing of SbSn/CoTi/Ir* anodes showed formation of $ClO_4^-$ (FIG. 7E), in agreement with previous studies demonstrating that non-active electrodes produce $ClO_4^-$ more readily than active electrode.

The disclosed anodes also generated other radicals, which were experimentally measured during electrolysis testing. In addition to free chlorine, electrolysis of NaCl aqueous solution generates radicals such as ·OH, Cl· and $Cl_2^-$. Electrolysis of benzoic acid (BA) was performed galvanostatically to measure radical generation. BA was selected as a radical probe compound since it reacts with ·OH, Cl· and $Cl_2^-$ (rate constants given in Table 1) but does not react with free chlorine.

TABLE 1

Key Reactions in $Na_2SO_4$ and NaCl electrolysis.

| Rxn No. | Reaction | Rate constant | Reference |
|---|---|---|---|
| | Composite reactions | | |
| 1ᵃ | $MO_x + H_2O \rightarrow MO_x + HO• + H^+ + e^-$ | $r_{HO•}$ | |
| 2 | $MO_x + Cl^- \rightarrow Mo_x + Cl• + e^-$ | $k_{Cl•}$ | |
| 3 | $2MO_x + 2Cl^- \rightarrow 2MO_x + Cl_2$ | $k_1$ | |
| 4 | $MO_x + OCl^- \rightarrow MO_{x-1} + ClO_3^-$ | $k_2$ | |
| 5 | $MO_x + ClO_3^- \rightarrow MO_{x-1} + ClO_4^-$ | $k_3$ | |
| | pH dependent equilibrium | | |
| 6ᵇ | $H^+ + OH^- \rightarrow H_2O$ | $1.00 \times 10^{11}\ M^{-1}s^{-1}$ | 4 |
| 7 | $H_2O \rightarrow H^+ + OH^-$ | $1.00 \times 10^{-3}\ M^{-1}s^{-1}$ | 4 |
| 8 | $OCl^- + H^+ \rightarrow HOCl$ | $5.00 \times 10^{10}\ M^{-1}s^{-1}$ | 4 |
| 9 | $HOCl \rightarrow OCl^- + H^+$ | $1.60 \times 10^3\ s^{-1}$ | 4 |
| 10 | $Cl_2 + H_2O \rightarrow Cl_2OH^- + H^+$ | $1.50 \times 10^1\ M^{-1}s^{-1}$ | 5 |
| 11 | $Cl^- + HOCl \rightarrow Cl_2OH^-$ | $1.5 \times 10^4\ M^{-1}s^{-1}$ | 5 |
| 12 | $Cl_2OH^- \rightarrow HOCl + Cl^-$ | $5.50 \times 10^9\ M^{-1}s^{-1}$ | 5 |
| 13 | $C_6H_5COOH \Leftrightarrow C_6H_5COO^- + H^+$ | $pK_a = 4.2$ | 6 |
| | HO• transformation | | |
| 14 | $HO• + HO• \rightarrow H_2O_2$ | $5.50 \times 10^9\ M^{-1}s^{-1}$ | 7 |
| 15 | $HO• \rightarrow O•^- + H^+$ | $1.26 \times 10^{12}\ M^{-1}s^{-1}$ | 8 |
| 16 | $O•^- + H_2O \rightarrow HO• + OH^-$ | $1.80 \times 10^6\ M^{-1}s^{-1}$ | 8 |
| 17 | $HO• + OH^- \rightarrow O•^- + H_2O$ | $1.30 \times 10^{10}\ M^{-1}s^{-1}$ | 8 |
| | Cl• transformation | | |
| 18 | $Cl^- + H• \rightarrow ClOH•^-$ | $4.30 \times 10^9\ M^{-1}s^{-1}$ | 7 |
| 19 | $ClOH•^- \rightarrow Cl^- + HO•$ | $6.10 \times 10^9\ s^{-1}$ | 9 |
| 20 | $Cl• + OH^- \rightarrow ClOH•^-$ | $1.80 \times 10^{10}\ M^{-1}s^{-1}$ | 10 |
| 21 | $ClOH•^- + H^+ \rightarrow Cl• + H_2O$ | $2.10 \times 10^{10}\ M^{-1}s^{-1}$ | 9 |
| 22 | $ClOH•^- + Cl^- \rightarrow Cl_2•^- + OH^-$ | $1.00 \times 10^5\ M^{-1}s^{-1}$ | 11 |
| 23 | $Cl_2•^- + OH^- \rightarrow ClOH•^- + Cl^-$ | $4.50 \times 10^7\ M^{-1}s^{-1}$ | 11 |

TABLE 1-continued

Key Reactions in $Na_2SO_4$ and NaCl electrolysis.

| Rxn No. | Reaction | Rate constant | Reference |
|---|---|---|---|
| 24 | $Cl\bullet + Cl^- \to Cl_2\bullet^-$ | $6.50 \times 10^9 \ M^{-1} s^{-1}$ | 10 |
| 25 | $Cl_2\bullet^- \to Cl\bullet + Cl^-$ | $1.10 \times 10^5 \ M^{-1} s^{-1}$ | 9 |
| 26 | $Cl\bullet + Cl\bullet \to Cl_2$ | $1.00 \times 10^8 \ M^{-1} s^{-1}$ | 12 |
| 27 | $Cl\bullet + Cl_2\bullet^- \to Cl^- + Cl_2$ | $1.4 \times 10^9 \ M^{-1} s^{-1}$ | 13 |
| 28 | $Cl_2\bullet^- + Cl_2\bullet^- \to 2Cl^- + Cl_2$ | $8.30 \times 10^8 \ M^{-1} s^{-1}$ | 7 |
| 29 | $Cl_2\bullet^- + HO\bullet \to HOCl + Cl^-$ | $1.00 \times 10^9 \ M^{-1} s^{-1}$ | 7 |
| | Radicals quenched by free chlorine | | |
| 30 | $HO\bullet + HOCl \to ClO\bullet + H_2O$ | $2.00 \times 10^9 \ M^{-1} s^{-1}$ | 4 |
| 31 | $HO\bullet + OCl^- \to ClO\bullet + OH^-$ | $8.80 \times 10^9 \ M^{-1} s^{-1}$ | 14 |
| 32 | $Cl\bullet + HOCl \to ClO\bullet + H^+ + Cl^-$ | $3.00 \times 10^9 \ M^{-1} s^{-1}$ | 15 |
| 33 | $Cl\bullet + OCl^- \to ClO\bullet + Cl^-$ | $8.20 \times 10^9 \ M^{-1} s^{-1}$ | 9 |
| | Radicals quenched by benzoic acid | | |
| 34 | $HO\bullet + C_6H_5COO^- \to Product\ 1$ | $5.90 \times 10^9 \ M^{-1} s^{-1}$ | 8 |
| 35 | $Cl\bullet + C_6H_5COO^- \to Product\ 2$ | $1.80 \times 10^{10} \ M^{-1} s^{-1}$ | 16 |
| 36 | $Cl_2\bullet^- + C_6H_5COO^- \to Product\ 3$ | $2.00 \times 10^6 \ M^{-1} s^{-1}$ | 17 |
| 37 | $O\bullet^- + C_6H_5COO^- \to Product\ 4$ | $4.00 \times 10^7 \ M^{-1} s^{-1}$ | 8 |

[a]Concentrations of active sites $MO_x$ and $H_2O$ were set as unity.
[b]Concentrations of $H^+$ and $OH^-$ was set as $3.16 \times 10^{-9}$ and $3.16 \times 10^{-6}$, respectively.

FIGS. 8A and B are graphs that show the experimental results of electrolysis involving BA. The graphs illustrate BA degradation with the SbSn/CoTi/Ir* anode (FIG. 8A) and the SbSn/CoTi/Ir anode (FIG. 8B) under variable current densities (L: 25 mA/cm2, H: 50 mA/cm2) and initial Cl-concentration (30 and 60 mM). Error bars represent the standard deviation.

BA degradation in a 30 mM $Na_2SO_4$ electrolyte solution at 25 mA/cm$^2$ was observed only with SbSn/CoTi/Ir* anodes (FIG. 8A). When current density was increased to 50 mA/cm$^2$, BA degradation was observed with SbSn/CoTi/Ir anodes (FIG. 8B), but was not observed with CoTi/Ir and Ti/Ir anodes without added Sb—$SnO_2$ islands (data not shown). BA could be degraded via direct oxidation on BDD electrodes at high oxidation potentials (i.e., 2.4 VNHE). However, this pathway was excluded in the current study as the same current responses in linear sweeping voltammetry were observed in $Na_2SO_4$ in the absence or presence of 1 mM BA (data not shown). The contribution of sulfate radical is excluded as the same BA decay kinetic was observed in 30 mM $NaNO_3$ electrolyte. Thus, degradation of BA is attributed to reaction with $\cdot$OH. Assuming that the generation of $\cdot$OH is a zero-order reaction, the generation rate ($r_{HO\bullet}$; M/s) could be estimated by fitting BA degradation data with a kinetic model (Table 2). SbSn/CoTi/Ir* was found to be more efficient than SbSn/CoTi/Ir in terms of $\cdot$OH generation (FIG. 8A vs. 8B). The steady state $\cdot$OH radical concentrations were calculated to be $2.6 \times 10^{-15}$ and $1.4 \times 10^{-15}$ mol/L for SbSn/CoTi/Ir* and SbSn/CoTi/Ir anodes, respectively.

TABLE 2

Rate Constants Estimated by Kinetic Modeling

| | 25 mA/cm$^2$ | | 50 mA/cm$^2$ | |
|---|---|---|---|---|
| | CoTi/Ir | SbSn/CoTi/Ir | SbSn/CoTi/Ir* | SbSn/CoTi/Ir |
| $k_1$ ($10^{-3}$ s$^{-1}$) | 2.69 | 7.65 | 3.15 | 14.5 |
| $k_2$ ($10^{-5}$ s$^{-1}$) | 1.88 | 6.06 | 32.8 | 19.2 |
| $k_3$ ($10^{-4}$ s$^{-1}$) | | | 2.18 | 0.0877 |
| $r_{HO\bullet}$ ($10^{-8}$ MS$^{-1}$) | | | 1.38 | 0.792 |
| $k_{Cl\bullet}$ ($10^{-6}$ s$^{-1}$) | | | 6.48 | 14.9 |

BA degradation was accelerated in the presence of 30 mM NaCl (FIGS. 8A and B). This implies that more radicals were generated in the presence of Cl$^-$. It is well-known that Cl$\cdot$ reacts at similar rates as $\cdot$OH with organic molecules. However, Cl$\cdot$, which is involved in the V-H step (lines representing the Volmer step and Heyrovsky step in FIG. 9), is assumed to be surface-bound and to rapidly combine with local Cl$\cdot$ or Cl$^-$, and hence is unlikely to contribute to BA degradation. This assertion was supported by the lack of BA degradation that was observed with CoTi/Ir and Ti/Ir anodes, despite FC production (data not shown). The $\cdot$OH radicals can be quenched by Cl$^-$ to generate less reactive chlorine radicals (FIG. 9). A kinetic model in which $\cdot$OH is the only radical species failed to simulate the observed enhanced BA degradation rate. Therefore, there must be additional reactive radical inputs. One possibility involves the contribution by Sb—$SnO_2$ promoting the one-electron oxidation of Cl$^-$ to produce free Cl$\cdot$ (FIGS. 4 and 9):

(Eq. 5)

$$Cl^- \xrightarrow{Sb-SnO2} Cl\bullet + e^-$$

Generation of free Cl$\cdot$ on $SnO_2$ during electrolysis has been reported previously, although without substantiating experimental evidence. The kinetic model result, however, provides a self-consistent kinetic argument for the contributions of the various chlorine radical species to the overall rates. The kinetic model was also used to simulate degradation of BA in both $Na_2SO_4$ and NaCl electrolytes provided that Eq. 5 was included.

The first-order rate constant for Cl$\cdot$ formation ($k_{Cl\bullet}$; s$^{-1}$) obtained by model fitting was found to be more than two orders of magnitude higher than that for $\cdot$OH evolution (Table 2). The higher $k_{Cl\bullet}$ of SbSn/CoTi/Ir compared with that of SbSn/CoTi/Ir* may be explained by the Sb—$SnO_2$ islands accepting more Cl$\cdot$ from the Co—$TiO_2$ sites (FIG. 5).

Even though electron transfer reactions leading to the generation of Cl$\cdot$ and $\cdot$OH were the initial radical formation steps on the anodes, additional modeling of the entire set of free radical concentrations ($\cdot$OH, O$\cdot^-$, Cl$\cdot$, Cl$_2^-$ and ClOH$\cdot^-$) showed that the dominant radical species by concentration was $Cl_2^-$. Model simulation further indicates that the combination of $Cl\cdot$ and $Cl^-$ is the main pathway for $Cl_2^-$ formation.

An increase in $Cl^-$ concentrations from 30 to 60 mM resulted in a lowering of the observed BA degradation rate (FIGS. 8A and B). This apparent inhibition could be attributed to the role played by FC scavenging $\cdot OH$ and $Cl\cdot$. The decreased BA degradation rate and reduced radical concentrations observed at 60 mM NaCl were successfully predicted by the kinetic modeling results (dotted line in FIGS. 8A and B).

The relative contributions of various free radicals to the BA degradation rate were estimated by simulating the oxidation of BA by a specific target radical while excluding other radical reactions in the model. It appears that $Cl\cdot$ was the major contributor to BA oxidation, followed by $Cl_2\cdot^-$ and $\cdot OH$, even though $Cl_2\cdot^-$ has the highest concentration. This was due to the much higher reaction rate of BA with $Cl\cdot$ as compared to $Cl_2\cdot^-$ ($1.9\times10^{10}$ vs. $2.0\times10^6$ $M^{-1}$ $s^{-1}$).

Based on the calibrated rate constants, the kinetic model is able to predict reactive species formation and steady-state concentrations. In general, the FC concentrations were found to be ten orders of magnitude higher than radical concentrations.

Example 5

Kinetic modeling of CER and radical production during NaCl electrolyte electrolysis was performed using Kintecus 5.75 chemical kinetic modeling software equipped with a Bader-Deuflhard integrator. The model used contained 37 reactions, which are shown in Table 1 above. The pH was held constant at 8.5, which was typical of conditions during NaCl electrolysis (pH rapidly increased to 8.5 within one minute of electrolysis) and wastewater electrolysis. Unknown rate constants for the models were obtained by fitting the experimental data with the kinetic model.

Kinetic modeling was performed to estimate rate constants of key reactions involved in the evolution of $Cl_2$ (Eq. 6, below) and the pH-dependent equilibria of $Cl_2$, HOCl and $OCl^-$ (Table 1).

(Eq. 6)

The direct oxidation of $HOCl/OCl^-$ into $ClO_3^-$, and $ClO_3^-$ into $ClO_4^-$ were considered as well:

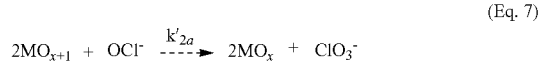
(Eq. 7)

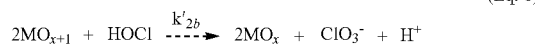
(Eq. 8)

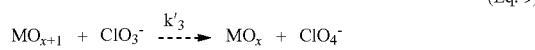
(Eq. 9)

The overall kinetics could be treated as first-order reaction in series:

$$d[Cl^-]/dt = -k_1[Cl^-] \quad \text{(Eq. 10)}$$

$$d[FC]/dt = k_1[Cl^-] - k_2'[MO_{x+1}][FC] \quad \text{(Eq. 11)}$$
$$= k_1[Cl^-] - k_2[FC]$$

$$d[ClO_3^-]/dt = k_2'[MO_{x+1}][FC] - k_3'[MO_{x+1}][ClO_3^-] \quad \text{(Eq. 12)}$$
$$= k_2[FC] - k_3[ClO_3^-]$$

$$d[ClO_4^-]/dt = k_3'[MO_{x+1}][ClO_3^-] = k_3[ClO_3^-] \quad \text{(Eq. 13)}$$

FC formation rates ($k_1$) for the CoTi/Ir and SbSn/CoTi/Ir anodes were found to be more than two orders of magnitude higher than $ClO_3^-$ formation rates ($k_2$) (See Table 2).

$ClO_4^-$ formation rates ($k_3$) were only calculated for SbSn/CoTi/Ir* anodes and were lower than FC and $ClO_3^-$ formation rates ($k_1$ and $k_2$), in line with previous research showing that the oxidation of $ClO_3^-$ to $ClO_4^-$ is sluggish. Increased current density (50 vs. 25 mA/cm$^2$) with SbSn/CoTi/Ir anodes did not markedly increase the FC concentration, but instead resulted in greater $ClO_3^-$ production (FIGS. 7A-E).

Model fitting showed that an increase in current density led to an increase in apparent rate constants (see Table 2), which can be explained by the Butler-Volmer formulation. That is, the simultaneous increase of FC production rate ($k_1$) and FC oxidation rate ($k_2$) results in a less pronounced increase of d[FC]/dt in Eq. 11, which explains the inefficient chlorine accumulation at 50 mA/cm$^2$ (FIGS. 7A-E).

The modeling shows that an increase in the $Cl^-$ concentration increases the FC concentration more efficiently than an increased current density. Doubling $Cl^-$ concentrations (i.e., 60 vs. 30 mM) during electrolysis with CoTi/Ir, SbSn/CoTi/Ir and SbSn/CoTi/Ir* anodes at 25 mA/cm$^2$ resulted in approximately double the peak FC concentration (FIGS. 7A-E).

Modeling of the electrolytic process in 60 mM NaCl gave results that were consistent with the experimental data (FIGS. 7A-E). However, the actual increase of $ClO_4^-$ production with SbSn/CoTi/Ir* anode was less than predicted. This may have been because high $Cl^-$ concentrations inhibited $ClO_4^-$ formation by blocking active sites for the oxidation of $ClO_3^-$ to $ClO_4^-$. Nevertheless, the kinetic model as presented provides a simple but powerful tool for the optimization of CER.

Example 6

The active SbSn/CoTi/Ir anode (first anode) and non-active SbSn/CoTi/Ir* anode (second anode) were also tested in terms of their potential for domestic (e.g., human waste) wastewater treatment.

For wastewater tests, human wastewater was collected from the public solar toilet prototype located on the California Institute of Technology campus (Pasadena, CA). Chemical oxygen demand (COD) of the wastewater was determined by dichromate digestion (Hach method 8000). Total organic carbon (TOC) was analyzed by an Aurora TOC analyzer. Anions ($Cl^-$, $ClO_3^-$, $ClO_4^-$, $NO_3^-$ and $PO_4^{3-}$) and cations ($NH_4^+$, $Na^+$, $Ca_2^+$ and $Mg_2^+$) were simultaneously detected by ion chromatography (ICS 2000, Dionex; Ionpac AS 19 and Ionpac CS 16 columns).

In terms of COD removal, the SbSn/CoTi/Ir anode (first anode) outperforms the commercial anode but was less efficient than the SbSn/CoTi/Ir* anode (second anode) at 25 mA/cm$^2$ in 30 mM $Cl^-$ (FIG. 10A).

FIGS. 10a-c are graphs comparing the experimental results of wastewater treatment using the disclosed anodes and a prior anode. FIG. 10A is graph showing concentration vs. time profiles of chemical oxygen demand (COD) in wastewater electrolyzed by SbSn/CoTi/Ir and SbSn/CoTi/Ir* anodes (first and second anodes) and the commercial anode under various current densities (L=25 mA/cm$^2$, H=50 mA/cm$^2$) and initial Cl$^-$ concentration (30, 60 mM). FIG. 10B is graph showing concentration vs. time profiles of NH$_4^+$ in wastewater electrolyzed by SbSn/CoTi/Ir and SbSn/CoTi/Ir* anodes (first and second anodes) and the commercial anode under various current densities (L=25 mA/cm$^2$, H=50 mA/cm$^2$) and initial Cl$^-$ concentration (30, 60 mM). FIG. 10C is a graph showing removal of total organic carbon (TOC) after 4 hour electrolysis by the different anodes. Error bars in the graphs represent standard deviation. Experimental data were collected from SbSn/CoTi/Ir anode except the data labeled with SbSn/CoTi/Ir* or commercial, which were collected from the second anode and commercial anode, respectively.

Assuming that direct oxidation of COD is insignificant, then the COD removal obtained with the SbSn/CoTi/Ir anode at 25 mA/cm$^2$ should take place exclusively via FC mediated oxidation. Conversely, calculations showed that the radical-mediated oxidation pathways contributed up to 80% of COD removal on SbSn/CoTi/Ir* anode (FIGS. 11A-E). This result suggests that the radicals produced by the "nonactive" SbSn/CoTi/Ir* anodes were more efficient for COD removal than FC alone. However, TOC analysis showed that complete mineralization of the organic carbon in human wastewater was not observed with the SbSn/CoTi/Ir* anode (FIG. 10C), in spite of complete COD removal. This may be due, in part, to the contribution of Cl$_2 \cdot^-$ as the dominated radical species. Cl$_2 \cdot^-$ reacts with organics via hydrogen abstraction, electrophilic addition and electron transfer. The residual TOC may be due to the formation of chlorinated byproducts or to an accumulation of formate and oxalate. For example, a recent study using commercially available Ir-based anodes found that four hour human wastewater treatment via chlorine-mediated EO will form trihalomethanes and haloacetic acids. Considering that the concentrations are generally within the range of those reported for secondary effluent after disinfection process and swimming pool waters, the treated water should be safe for non-potable reuse.

Increasing the Cl$^-$ concentration to 60 mM significantly enhanced organic matter removal for the SbSn/CoTi/Ir anode system. This is likely due to enhanced FC evolution, which effectively compensated for the first anode's inability to generate radicals at 25 mA/cm$^2$. At 50 mA/cm$^2$, the SbSn/CoTi/Ir anode produced more FC accompanied by sufficient radicals to achieve complete COD removal and greater than 50% TOC removal. In this case, the contributions of chlorine and radical mediated oxidation to COD removal were calculated to be 94% and 6% (FIGS. 11A-E).

Figure 12A:
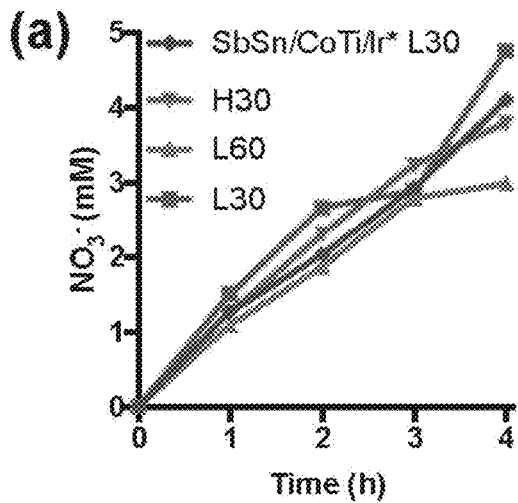
FIGS. 12A-B are graphs showing example experimental results for $NO_3^-$ formation and total nitrogen removal during wastewater electrolysis using the disclosed anodes.
Figure 12B:
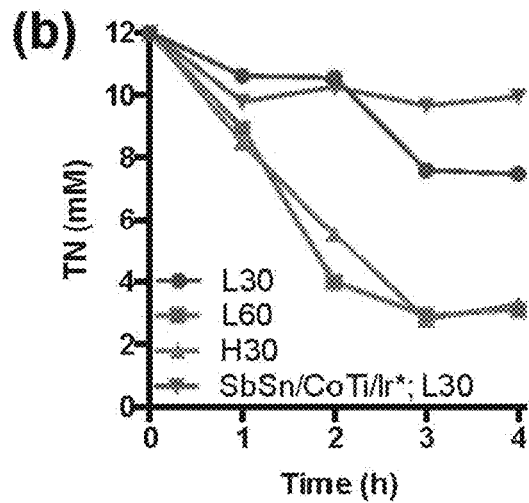

The SbSn/CoTi/Ir anode outperformed SbSn/CoTi/Ir* and commercial anodes for NH$_4^+$ removal (FIG. 10B), since NH$_4^+$ removal during electrochemical treatment is achieved via breakpoint chlorination, which, in turn, is an indirect measure of the CER activity. Most NH$_4^+$ was converted into N$_2$ with a smaller fraction oxidized to NO$_3^-$ (FIG. 12A-B). The SbSn/CoTi/Ir anode that was operated at L60 and H30 was capable of removing about 74% of total nitrogen after four hours electrolysis (FIG. 12A-B).

Figure 13A:
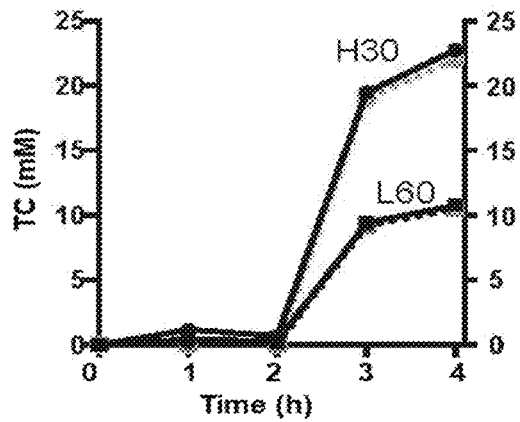
FIGS. 13A-C are graphs showing example experimental results for total chlorine (TC) and free chlorine (FC) generation by the disclosed anodes during wastewater electrolysis.
Figure 13B:
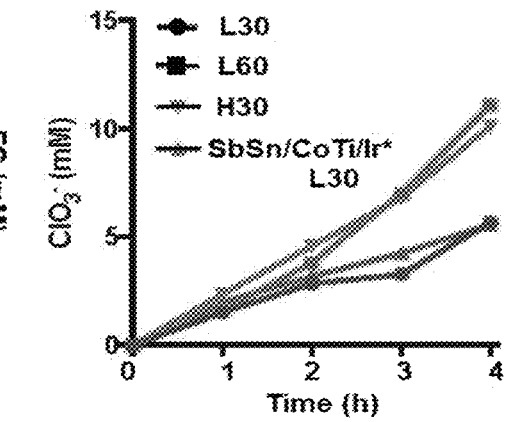
Figure 13C:
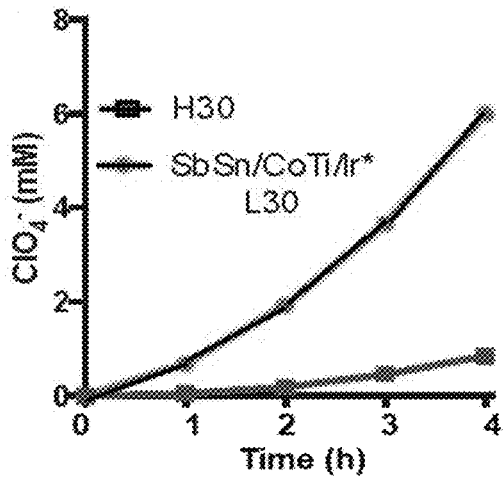

Total chlorine (TC) and free chlorine (FC) concentrations were low (<2 mM) during electrochemical wastewater treatment (30 mM Cl$^-$, 25 mA/cm$^2$) with SbSn/CoTi/Ir* and SbSn/CoTi/Ir anodes. Chlorine was consumed during breakpoint chlorination or by wastewater organic matter degradation within the electrical double layer, and thus was unable to diffuse into the bulk solution phase. Generation of both TC and FC was only observed with SbSn/CoTi/Ir anodes after complete NH$_4^+$ and COD removal (FIG. 13A-C). Up to 5 mM ClO$_3^-$ was produced after four hours of electrolysis (30 mM Cl$^-$; 25 mA/cm$^2$) with both types of anodes (FIG. 13A-C). Increasing either current or the Cl$^-$ concentration increased ClO$_3^-$ production (i.e., 10-11 mM maximum). These trends were in agreement with experiments in NaCl solutions, although concentrations were about 50% lower.

Significant concentrations of ClO$_4^-$ (6 mM) were produced by SbSn/CoTi/Ir* anode after four hours of electrolysis of wastewater under low Cl$^-$ and low current conditions (i.e., 30 mM Cl$^-$; 25 mA/cm$^2$; FIG. 13a-c). However, the SbSn/CoTi/Ir anode formed relatively low concentrations of ClO$_4^-$ (0.85 mM) under high current conditions (i.e., 30 mM Cl$^-$; 50 mA/cm$^2$).

The SbSn/CoTi/Ir anode, which was operated at 60 mM Cl$^-$ and 25 mA/cm$^2$, consumed less energy than the SbSn/CoTi/Ir* anode for COD and NH$_4^+$ removal (370 kWh/kg COD; 383 kWh/kg NH$_4^+$). These values are still higher than those reported in the EO of leachate and reverse osmosis concentrate, probably due to the lower conductivity (3.2 mS/cm) of human wastewater. Reducing the electrode spacing or increasing the wastewater conductivity may be able to further lower the energy consumption.

The SbSn/CoTi/Ir anode is a significantly improved electrolysis anode in terms of durability, reactive species generation, pollutant removal, byproduct formation, and energy consumption. More efficient wastewater treatment provided by an active anode (SbSn/CoTi/Ir) as compared to a nonactive anode (SbSn/CoTi/Ir*) highlights the limitation of non-active anodes for wastewater treatment due to ·OH quenching by Cl$^-$ and FC. In addition, non-active anodes produce a significant amount of ClO$_4^-$. Under appropriate conditions, wastewater electrolysis mediated by electrochemically produced FC may be able to outperform radical-assisted electrolysis.

Wastewater treated in an appropriately designed reactor equipped with SbSn/CoTi/Ir or Sn/CoTi/Ir anodes may be suitable for non-potable water reuse (e.g., as recycled toilet flushing water based on color and COD removal), as well as for disinfection, which is provided by the residual FC. The semiconductor electrolytic reactors disclosed herein can be easily automated (e.g., reaching the breakpoint for NH$_4^+$ chlorination can be used as a signal to end batch treatment). They can be an excellent fit for use in decentralized wastewater treatment.

The disclosed anodes may be employed in solar powered toilets and waste treatment systems, for example, those disclosed in U.S. Published Patent Application 2014/0209479, which is incorporated by reference herein in its entirety. For example, the source 38 of FIG. 1 herein may be a photovoltaic source. And the electrolysis can be done on human waste, such as the electrolysis of urine depicted in FIG. 17C of U.S. Published Patent Application 2014/0209479.

The disclosed anodes may also be useful in the chlor-alkali industry. The chlor-alkali process is an industrial process for the electrolysis of NaCl brine. It is the technology used to produce chlorine and sodium hydroxide (lye/caustic soda), which are commodity chemicals required by industry. To perform a chlor-alkali process, any of the disclosed anodes may be placed and used in a reactor, such at one of those shown in FIGS. 1 and 2, for the electrolysis of NaCl brine. The reactor is filled with suitable NaCl brine. When placed in the reactor, the anode contacts the NaCl brine. An anodic potential that is sufficient to generate reactive chlorine at the anode is then applied to the anode by a source, as shown in FIG. 1. As shown in FIG. 2, multiple anodes and cathodes can be used in the process.

The foregoing description is illustrative and not restrictive. Although certain exemplary embodiments have been described, other embodiments, combinations and modifications involving the invention will occur readily to those of ordinary skill in the art in view of the foregoing teachings. Therefore, this invention is to be limited only by the following claims, which cover the disclosed embodiments, as well as all other such embodiments and modifications when viewed in conjunction with the above specification and accompanying drawings.

The invenion claimed is:

1. An electrolysis anode, comprising:
a first conductive metal oxide layer comprising $Ir_{0.7}Ta_{0.3}O_2$ having a mass loading value selected from the group consisting of about 0.3 mg/cm$^2$ and about 0.05 mg/cm$^2$;
a second semiconductor layer directly physically contacting the first conductive metal oxide layer, wherein the second semiconductor layer includes Co—TiO$_2$; and
one or more islands of a third semiconductor contacting the second semiconductor layer, wherein the third semiconductor comprises antimony doped tin dioxide, wherein each of the islands has a general diameter of about 1 μM to 8 μM, wherein the islands cover about 50% of the surface area of the second semiconductor layer.

2. The anode of claim 1, further comprising:
a metal conductor contacting the first conductive metal oxide layer.

3. The anode of claim 2, wherein the metal conductor is titanium.

4. A water purification system, comprising:
an anode of claim 1,
wherein the second semiconductor layer contacting the first conductive metal oxide layer and configured to be, at least in part, in direct contact with water that includes chloride, and
the one or more islands of a third semiconductor contacting the second semiconductor layer and configured to be in direct contact with the water.

5. The system of claim 4, further comprising a stainless steel cathode.

6. The system of claim 4, further comprising a voltage source connected to a cathode and the anode.

7. The system of claim 4, further comprising an electrolysis vessel for holding the water, anode and a cathode.

8. An electrolysis anode, consisting essentially of:
a first conductive metal oxide layer comprising $Ir_{0.7}Ta_{0.3}O_2$ having a mass loading value selected from the group consisting of about 0.3 mg/cm$^2$ and about 0.05 mg/cm$^2$;
a second semiconductor layer directly physically contacting the first conductive metal oxide layer, wherein the second semiconductor layer includes Co—TiO$_2$; and
one or more islands of a third semiconductor contacting the second semiconductor layer, wherein the third semiconductor comprises antimony doped tin dioxide, wherein each of the islands has a general diameter of about 1 μM to 8 μM, wherein the islands cover about 50% of the surface area of the second semiconductor layer.

* * * * *